(12) United States Patent
Den Breejen et al.

(10) Patent No.: US 10,809,447 B2
(45) Date of Patent: Oct. 20, 2020

(54) LUMINAIRE HAVING AN ASYMMETRICAL LIGHT DISTRIBUTION PATTERN

(71) Applicant: Lumileds LLC, San Jose, CA (US)

(72) Inventors: Jeroen Den Breejen, San Jose, CA (US); Frederic S. Diana, Santa Clara, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/424,047

(22) Filed: May 28, 2019

(65) Prior Publication Data

US 2019/0324188 A1 Oct. 24, 2019

Related U.S. Application Data

(63) Continuation of application No. 15/700,938, filed on Sep. 11, 2017, now Pat. No. 10,345,509.

(Continued)

(30) Foreign Application Priority Data

Dec. 14, 2016 (EP) .................................... 16204094

(51) Int. Cl.
*F21V 21/00* (2006.01)
*F21V 8/00* (2006.01)
(Continued)

(52) U.S. Cl.
CPC ............ *G02B 6/0063* (2013.01); *F21S 8/085* (2013.01); *F21S 8/086* (2013.01); *G02B 6/00* (2013.01);
(Continued)

(58) Field of Classification Search
CPC ........ F21S 8/085; F21S 8/086; G02B 6/0031; G02B 6/0043; G02B 6/0055; G02B 6/0068; F21Y 2105/12; F21W 2131/103
(Continued)

(56) References Cited

U.S. PATENT DOCUMENTS

| 7,400,439 B2 | 7/2008 | Holman |
| 8,721,149 B2 | 5/2014 | Holman et al. |

(Continued)

FOREIGN PATENT DOCUMENTS

| CN | 202532220 U | 11/2012 |
| CN | 110036234 A | 7/2019 |

(Continued)

OTHER PUBLICATIONS

"U.S. Appl. No. 15/700,938, Corrected Notice of Allowability dated Apr. 26, 2019", 2 pgs.

(Continued)

*Primary Examiner* — Laura K Tso
(74) *Attorney, Agent, or Firm* — Schwegman Lundberg & Woessner, P.A.

(57) ABSTRACT

An apparatus is disclosed including a light guide and a plurality of light emitting diodes (LEDs). The light guide includes a rear portion including a first edge, a second edge, and a rear edge. The first edge meets the rear edge at a first obtuse angle, and the second edge meets the rear edge at a second obtuse angle. The plurality of light emitting diodes (LEDs) disposed on the first edge, the second edge, and the rear edge, and it is arranged to produce an asymmetric light distribution pattern including a rear light emission and a forward light emission having a greater peak intensity than the rear light emission.

20 Claims, 14 Drawing Sheets

Related U.S. Application Data

(60) Provisional application No. 62/414,586, filed on Oct. 28, 2016, provisional application No. 62/393,294, filed on Sep. 12, 2016.

(51) Int. Cl.
| | |
|---|---|
| *F21S 8/08* | (2006.01) |
| *G02B 6/00* | (2006.01) |
| *F21Y 105/12* | (2016.01) |
| *F21Y 105/18* | (2016.01) |
| *F21Y 115/10* | (2016.01) |
| *F21S 2/00* | (2016.01) |
| *F21W 131/103* | (2006.01) |

(52) U.S. Cl.
CPC ......... *G02B 6/0021* (2013.01); *G02B 6/0031* (2013.01); *G02B 6/0043* (2013.01); *G02B 6/0055* (2013.01); *G02B 6/0068* (2013.01); *G02B 6/0073* (2013.01); *G02B 6/0091* (2013.01); *F21S 2/00* (2013.01); *F21W 2131/103* (2013.01); *F21Y 2105/12* (2016.08); *F21Y 2105/18* (2016.08); *F21Y 2115/10* (2016.08)

(58) Field of Classification Search
USPC .................................................. 362/600–634
See application file for complete search history.

(56) References Cited

U.S. PATENT DOCUMENTS

| | | | |
|---|---|---|---|
| 8,770,821 B2 | 7/2014 | Ijzerman et al. | |
| 10,345,509 B2 | 7/2019 | Den Breejen et al. | |
| 10,416,370 B2 * | 9/2019 | Diana .................. | G02B 6/0073 |
| 2003/0147257 A1 | 8/2003 | Lee | |
| 2005/0259438 A1 | 11/2005 | Mizutani et al. | |
| 2007/0263388 A1 | 11/2007 | Lai et al. | |
| 2008/0310184 A1 * | 12/2008 | Katsumata ........... | G02B 6/0043 |
| | | | 362/600 |
| 2009/0225566 A1 | 9/2009 | Zimmermann et al. | |
| 2009/0268484 A1 * | 10/2009 | Kim ...................... | G02B 6/0036 |
| | | | 362/608 |
| 2010/0290246 A1 | 11/2010 | Kim et al. | |
| 2011/0013420 A1 | 1/2011 | Coleman et al. | |
| 2012/0300494 A1 | 11/2012 | Watabe et al. | |
| 2013/0039093 A1 | 2/2013 | Song et al. | |
| 2013/0100704 A1 * | 4/2013 | Kykta ...................... | B05D 5/06 |
| | | | 362/627 |
| 2013/0148377 A1 * | 6/2013 | Mi ...................... | G02B 6/0036 |
| | | | 362/606 |
| 2014/0313765 A1 | 10/2014 | Nelson et al. | |
| 2015/0077643 A1 * | 3/2015 | Yamakawa .............. | H04N 5/64 |
| | | | 348/791 |
| 2016/0103266 A1 | 4/2016 | Li et al. | |
| 2016/0195666 A1 * | 7/2016 | Srinivasamurthy .. | G02B 6/0043 |
| | | | 362/612 |
| 2018/0074255 A1 | 3/2018 | Den Breejen et al. | |
| 2018/0113244 A1 * | 4/2018 | Vasylyev ............... | G02B 6/002 |

FOREIGN PATENT DOCUMENTS

| | | |
|---|---|---|
| DE | 102013211311 A1 | 12/2014 |
| DE | 102014119616 A1 | 6/2016 |
| EP | 2573455 A2 | 3/2013 |
| EP | 2153119 B1 | 12/2014 |
| EP | 2957827 A1 | 12/2015 |
| JP | 2002015603 A | 1/2002 |
| JP | 2003281917 A | 10/2003 |
| JP | 2003346530 A | 12/2003 |
| JP | 2006092485 A | 4/2006 |
| JP | 2007220352 A | 8/2007 |
| JP | 2012015603 A | 1/2012 |
| JP | 2012212532 A | 11/2012 |
| JP | 2012248293 A | 12/2012 |
| JP | 2013182730 A | 9/2013 |
| JP | 2013191338 A | 9/2013 |
| JP | 2016058233 A | 4/2016 |
| TW | 201617682 A | 5/2016 |
| TW | I685629 | 2/2020 |
| TW | 202020363 | 6/2020 |
| WO | WO-2011004320 A1 | 1/2011 |
| WO | WO-2013035788 A1 | 3/2013 |
| WO | WO-2018049395 A1 | 3/2018 |

OTHER PUBLICATIONS

"U.S. Appl. No. 15/700,938, Non Final Office Action dated Nov. 1, 2018", 7 pgs.

"U.S. Appl. No. 15/700,938, Notice of Allowability dated Jun. 6, 2019", 2 pgs.

"U.S. Appl. No. 15/700,938, Notice of Allowance dated Feb. 21, 2019", 8 pgs.

"U.S. Appl. No. 15/700,938, Response filed Feb. 1, 2019 to Non Final Office Action dated Nov. 1, 2018", 11 pgs.

"International Application Serial No. PCT/US2017/051165, International Preliminary Report on Patentability dated Mar. 21, 2019", 11 pgs.

"International Application Serial No. PCT/US2017/051165, International Search Report dated Nov. 21, 2017", 4 pgs.

"International Application Serial No. PCT/US2017/051165, Reply filed Mar. 25, 2019 to International Search Report dated Nov. 21, 2017", 11 pgs.

"International Application Serial No. PCT/US2017/051165, Written Opinion dated Nov. 21, 2017", 9 pgs.

"Lighting for Exterior Environments", IES RP-33-14, prepared by Illuminating Engineering Society of North America,, (2014), 1-48 (55 Pages).

"Taiwanese Application Serial No. 106131231, Office Action dated Mar. 29, 2019", w/English Translation, 9 pgs.

"Taiwanese Application Serial No. 106131231, Response Filed Jun. 28, 2019 to Office Action dated Mar. 29, 2019", w/English Claims, 54 pgs.

"Japanese Application Serial No. 2019-514000, Notification of Reasons for Refusal dated Jun. 2, 2020", w/ English Translation, 13 pgs.

* cited by examiner

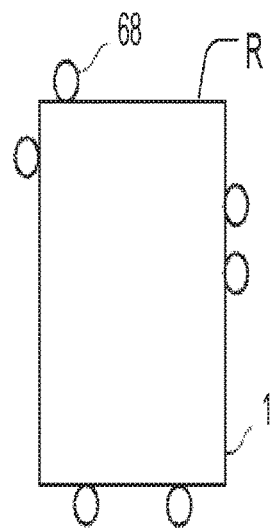
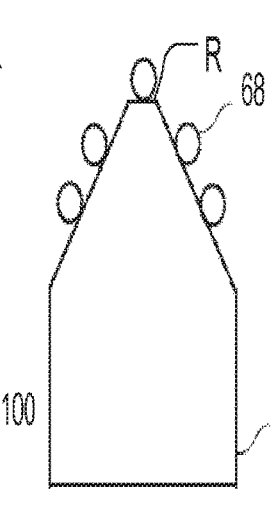
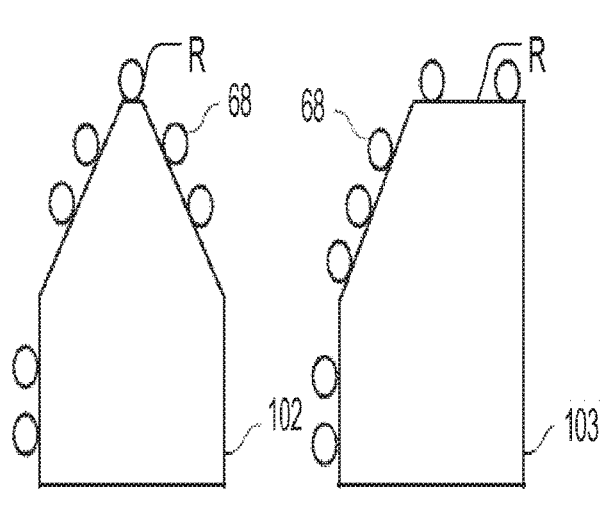
FIG. 23  FIG. 24  FIG. 25  FIG. 26

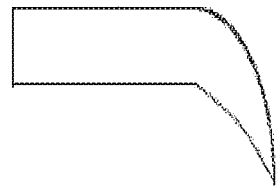
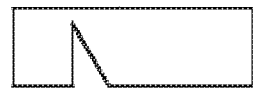
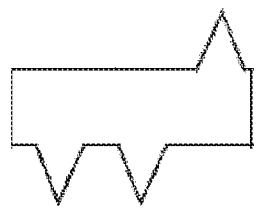
FIG. 39    FIG. 40    FIG. 41    FIG. 42
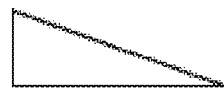
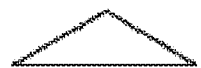
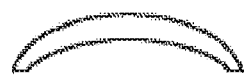
FIG. 43    FIG. 44    FIG. 45    FIG. 46
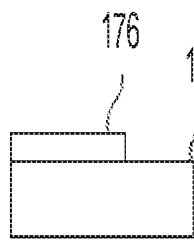
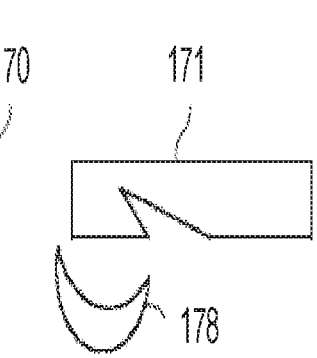
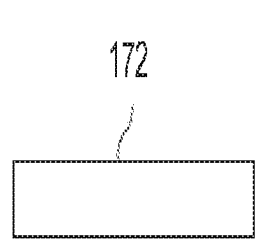
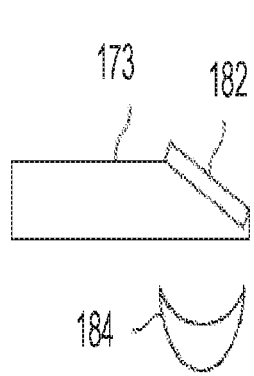
FIG. 47    FIG. 48    FIG. 49    FIG. 50

LUMINAIRE HAVING AN ASYMMETRICAL LIGHT DISTRIBUTION PATTERN

PRIORITY APPLICATIONS

This application is a continuation of U.S. patent application Ser. No. 15/700,938, filed Sep. 11, 2017, which claims priority to U. S. Provisional Application Ser. No. 62/414,586, filed Oct. 28, 2016, and U.S. Provisional Application Ser. No. 62/393,294, filed Sep. 12, 2016 the disclosures of which are incorporated by reference herein in their entireties.

FIELD OF INVENTION

The present disclosure relates to light emitting devices, in general, and more particularly to a luminaire having an asymmetrical light distribution pattern.

BACKGROUND

Light emitting diodes ("LEDs") are commonly used as light sources in various applications. LEDs are more energy-efficient than traditional light sources, providing much higher energy conversion efficiency than incandescent lamps and fluorescent light, for example. Furthermore, LEDs radiate less heat into illuminated regions and afford a greater breadth of control over brightness, emission color and spectrum than traditional light sources. These characteristics make LEDs an excellent choice for various lighting applications ranging from indoor illumination to street lighting.

Some lighting applications may require asymmetric light distribution patterns. For example, street lighting applications may require luminaires with asymmetrical light distribution patterns that illuminate streets well without throwing too much light in the direction of adjacent residential properties. However, such asymmetric light distribution patterns may be difficult to achieve without expensive secondary optics and complicated luminaire designs. In addition, existing LED-based outdoor luminaires are often composed of multiple, visible, LEDs which can produce discomfort to the eyes (glare) due to their high peak luminance producing pixelated or spotty light sources. Accordingly, the need exists for improved luminaire designs that provide controllable light distribution patterns with minimized glare and spottiness, without relying on expensive secondary optics.

SUMMARY

The present disclosure addresses this need. According to aspects of the disclosure, an apparatus is disclosed including a light guide and a plurality of LEDs. The light guide includes a rear portion including a first edge, a second edge, and a rear edge. The first edge meets the rear edge at a first obtuse angle, and the second edge meets the rear edge at a second obtuse angle. The plurality of LEDs disposed on the first edge, the second edge, and the rear edge, and it is arranged to produce an asymmetric light distribution pattern including a rear light emission and a forward light emission having a greater peak intensity than the rear light emission.

BRIEF DESCRIPTION OF THE DRAWINGS

The drawings described below are for illustration purposes only. The drawings are not intended to limit the scope of the present disclosure. Like reference characters shown in the figures designate the same parts in the various embodiments.

FIG. 23 is a top-down view of an example of a light guide assembly, according to aspects of the disclosure;

FIG. 24 is top-down view of an example of a light guide assembly, according to aspects of the disclosure;

FIG. 25 is top-down view of an example of a light guide assembly, according to aspects of the disclosure;

FIG. 26 is top-down view of an example of a light guide assembly, according to aspects of the disclosure;

FIG. 39 is a cross-sectional side view of an example of a light guide, according to aspects of the disclosure;

FIG. 40 is a cross-sectional side view of an example of a light guide, according to aspects of the disclosure;

FIG. 41 is a cross-sectional side view of an example of a light guide, according to aspects of the disclosure;

FIG. 42 is a cross-sectional side view of an example of a light guide, according to aspects of the disclosure;

FIG. 43 is a cross-sectional side view of an example of a light guide, according to aspects of the disclosure;

FIG. 44 is a cross-sectional side view of an example of a light guide, according to aspects of the disclosure;

FIG. 45 is a cross-sectional side view of an example of a light guide, according to aspects of the disclosure;

FIG. 46 is a cross-sectional side view of an example of a light guide, according to aspects of the disclosure;

FIG. 47 is a cross-sectional side view of an example of a light guide, according to aspects of the disclosure;

FIG. 48 is a cross-sectional side view of an example of a light guide, according to aspects of the disclosure;

FIG. 49 is a cross-sectional side view of an example of a light guide, according to aspects of the disclosure; and FIG. 50 is a cross-sectional side view of an example of a light guide, according to aspects of the disclosure.

DETAILED DESCRIPTION

Figure 1:
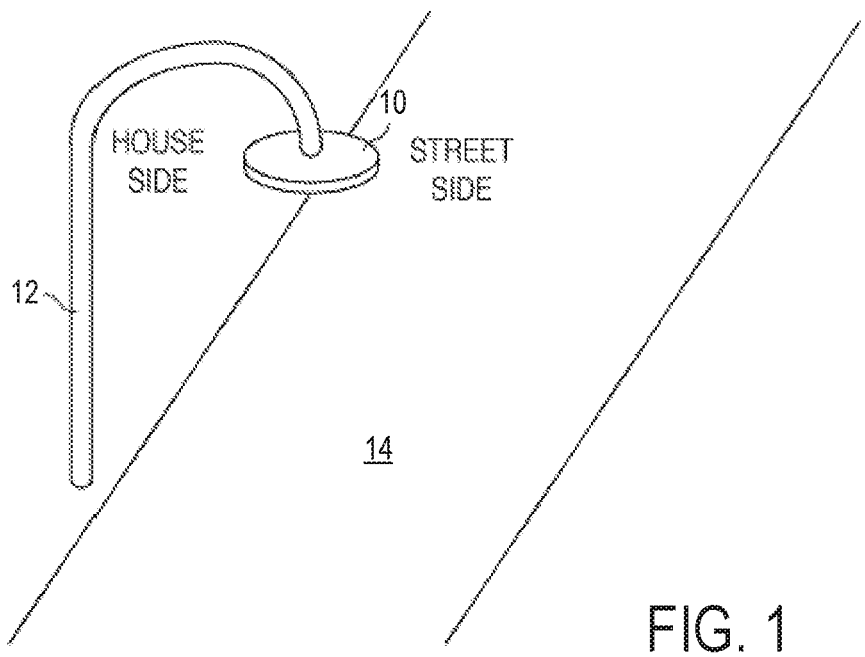
FIG. 1 is a perspective view of an example of a luminaire, according to aspects of the disclosure.

According to aspects of the disclosure, an LED-based luminaire is disclosed with reduced glare and spottiness and that does not require expensive secondary optics to produce an asymmetrical light distribution pattern. Reduced glare and spottiness is achieved by using light guide optics instead of standard molded lens arrays. The light guide optics can also be swapped in and out to change the luminaire's light distribution pattern, without affecting the luminaire's external appearance.

According to aspects of the disclosure, a light guide for use in street lighting applications is disclosed that may create a substantially uniform diffused light appearance. This is to be contrasted with street lights that utilize LED arrays with separate optics for each LED (e.g., lights that have 16 LEDs arranged in two columns of eight each). Such street lights may have high glare when viewed directly. Moreover, they create pixelated light patterns that are oftentimes found aesthetically unappealing by observers.

According to aspects of the disclosure, the luminaire light guide optics may not require injection molding process to shape and/or texture its external surfaces and produce the desired light distribution pattern. This could make it fairly inexpensive to supply a variety of similar looking luminaires that provide different light distribution patterns to fit different street lighting applications, such as suburban street lighting, corner lighting, and intersection lighting, for example.

According to aspects of the disclosure, a light guide assembly is disclosed that is provided with different features that impart directionality on the light emitted from the light guide assembly. Those features may include the shape of the light guide, Gaussian dots that are printed on the light guide, prisms that are molded on the light guide, grooves that are molded or etched on the light guide, and/or random surface roughening. As a result of those features, the light guide assembly may not rely on secondary optics to achieve a particular distribution pattern. Notwithstanding, the light guide assembly may also be used in conjunction with secondary optics if needed.

According to aspects of the disclosure, a light guide is disclosed for use in various lighting applications. The light guide may be a slate formed of a transparent or translucent material. The slate may have a plurality of edges, and two surfaces. Most of the light output by the light guide may exit the light guide through one or more of the surfaces. Accordingly, any of the surfaces from which light is emitted may be referred to as a light exit surface. In some implementations, one surface may be provided with a reflector to reflect light towards a designated light exit surface.

According to aspects of the disclosure, a light guide is disclosed that is optimized for producing asymmetrical light distribution patterns. The light guide features a front portion having slanted side edges and front portion having straight side edges. Each of the slanted side edges may meet a different one of the straight side edges. According to aspects of the disclosure, the angle between any of the slanted side edges and a given straight side edge determines what proportion of the light output of the light guide is directed in a particular direction. According to the present disclosure, varying that angle between 130 and 160 degrees has been found to be practical for imparting a desired directionality of the light output from the light guide.

According to aspects of the disclosure, a light guide assembly is disclosed that includes a plurality of LEDs and a light guide. The light guide may be shaped as a rectangle with its corners cut; it may have two slanted edges that meet a rear edge disposed between them at an obtuse angle. When the LEDs in the luminaire are concentrated on the slanted edges and the rear edge between them, the light guide may cause it to emit a greater proportion of its light output in the forward direction.

In some aspects, one or more surfaces of the light may be provided with a plurality of Gaussian dots to facilitate the extraction of light from the light guide. In some implementations, the density of the Gaussian dots at any location on the surface may be proportional to the distance between that location and the front edge. The smaller the distance, the greater the density. As is discussed further below, concentrating more Gaussian dots near the front edge of the light guide may facilitate light extraction in the forward direction.

According to aspects of the disclosure, a light guide assembly is disclosed that features a highly flexible design. The light guide assembly may include a light guide (e.g., a transparent or translucent slate) and an LED strip at least some of the edges of the light guide. The light distribution pattern of the light guide assembly may be adjusted by simply changing the type and/or length LED strip that is wrapped around the light guide. Accordingly, many different light distribution patterns may be achieved by changing the LED strip that is wrapped around the edges of a given light guide.

According to aspects of the disclosure, an apparatus is disclosed comprising: a light guide including a rear portion, the rear portion including a first edge, a second edge, and a rear edge, the first edge meeting the rear edge at a first obtuse angle, and the second edge meeting the rear edge at a second obtuse angle; and a plurality of light emitting diodes (LEDs) disposed on the first edge, the second edge, and the rear edge, the plurality of LEDs being arranged to produce an asymmetric light distribution pattern including a rear light emission and a forward light emission having a greater peak intensity than the rear light emission.

According to aspects of the disclosure, an apparatus is disclosed comprising: a support structure; a housing coupled to the support structure; a light guide arranged in the housing, the light guide including a front portion of uniform width and a rear tapered portion, the front portion including a front edge facing away from the support structure, and the rear portion including a rear edge facing towards the support structure; a plurality of light emitting diodes (LEDs) mounted around a perimeter of the rear portion of the light guide to produce an asymmetric light distribution having at least a front emission that is directed away from the support structure and a rear emission that is directed towards the support structure, the front emission having a greater peak intensity than the rear emission.

According to aspects of the disclosure, an apparatus is disclosed comprising: a light guide including a light emitting surface having a front portion that is rectangular in shape and a rear portion that is trapezoidal in shape; a plurality of LEDs coupled to one or more edges of the light guide that meet with the rear portion of the light emitting surface, plurality of LEDs being arranged to produce a light distribution pattern including a rear light emission and a front light emission having a greater peak intensity than the rear light emission.

Examples of different lighting devices will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

FIG. 1 is a perspective view of an example of a luminaire 10, according to aspects of the disclosure. The luminaire 10 is supported by a support structure 12 over a street 14. The front side of the luminaire 10 facing the street is herein referred to as "street side." The rear side of the luminaire facing in the opposite direction is herein referred to as "house side." Under this nomenclature, when light is output in the forward direction, it is said to be emitted in the street-side direction. Similarly, when light is output in the reverse direction, it is said to be emitted in the house-side direction. And when light is output sideways (e.g., in the left and/or right directions) it is said to be emitted along the street.

According to the present example, the luminaire 10 has a Type II asymmetric light distribution pattern. It is configured to provide a high light intensity along a certain length of the street, a lower light intensity in the street-side direction, and a much lower light intensity that in the house-side direction. In some instances, the luminaire 10 may be part of a larger street lighting system. The light along the length of the street may blend with light from the adjacent street lights to provide a uniform illumination of the entire street.

Figures 2, 3:
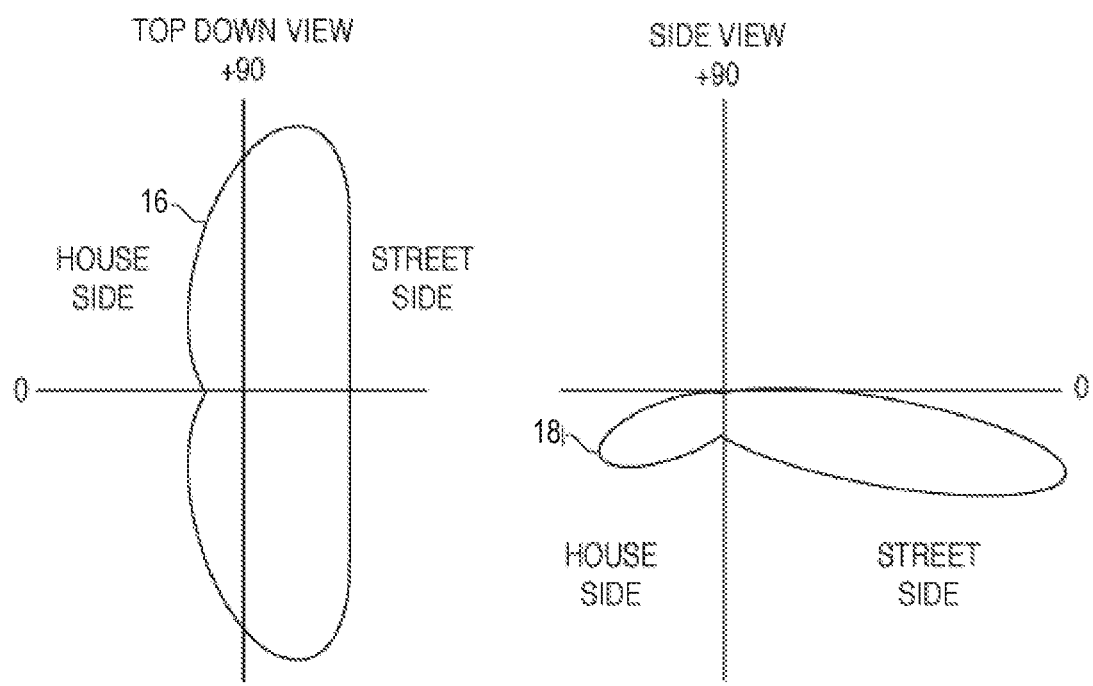
FIG. 2 is a candela diagram showing a light distribution pattern produced by the luminaire of FIG. 1 in a horizontal plane beneath the luminaire, according to aspects of the disclosure.
FIG. 3 is a candela diagram showing a light distribution pattern produced by the luminaire of FIG. 1 in a vertical plane intersecting the luminaire, according to aspects of the disclosure.

FIG. 2 is a candela diagram showing a light distribution pattern produced by the luminaire 10 in a horizontal plane beneath the luminaire (e.g., the plane of street 14), according to aspects of the disclosure. FIG. 3 is a candela diagram showing a light distribution pattern produced by the luminaire 10 in a vertical plane intersecting the luminaire, according to aspects of the disclosure. In the example shown, the peak light intensity directed along the street 14 is about 2-3 times higher than the peak light intensity that is produced in the street-side direction. Furthermore, the peak light intensity in the house-side direction is less than one-third of the light intensity in the street-side direction to minimize light trespass on neighboring properties. As can be readily appreciated, any light that is emitted in the house-side direction may be used for illuminating pathways along the street or for illuminating the curb area if the luminaire is suspended well into the street.

Figure 4:
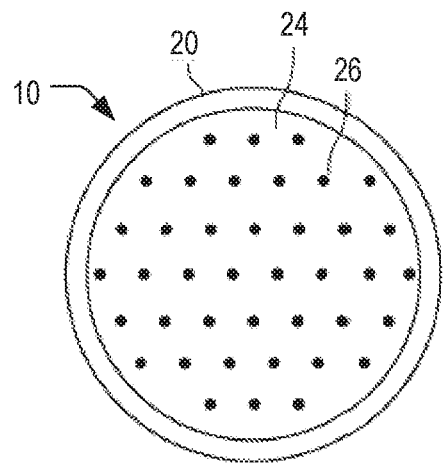
FIG. 4 is a top-down view of the luminaire of FIG. 1, according to aspects of the disclosure.

FIG. 4 is a top-down view of the luminaire 10, according to aspects of the disclosure. In this example, a cover (not shown) of the luminaire 10 is removed to reveal the luminaire's internal structure. Beneath the cover, the luminaire 10 includes a circular metal frame 20 that is arranged to receive a light guide 24. In some implementations, a flexible circuit tape (not shown), such as an LED strip, may be disposed between the edge of the light guide 24 and the frame 20. The flexible circuit tape may be disposed around the inner circumference of the frame 20 and it may contain a linear array of LEDs.

In some implementations, the frame 20 may be about 15 inches in diameter, and contain about 168 LEDs. In some implementations, the flexible LED circuit tape may be divided into 12 segments that are connected either in series or in parallel to a shared power supply. In some implementations, the light guide 24 may be formed of a transparent polymer, such as PMMA, and it may be about 4-5 mm thick. Additionally or alternatively, in some implementations the light guide 24 may have a plurality of Gaussian dots 26 printed thereon.

A reflector sheet (not shown) may be positioned over the light guide 24 and the LEDs to reflect light towards the street 14. The reflector sheet may be specular or a slightly diffusing mirror sheet, and it may substantially retain the directionality of light rays and provide better control over the light distribution pattern of the luminaire 10. Additionally or alternatively, in some implementations, the reflector sheet may have a white surface to greatly increase the diffusion of light for a more Lambertian light distribution pattern. The reflector sheet may be spaced apart from the light guide 24 or directly abutting it.

Figure 5:
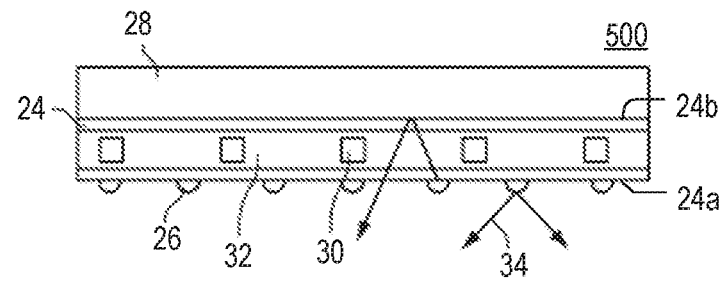
FIG. 5 is a cross-sectional side view of an example of a light guide assembly that can be used in the luminaire of FIG. 1, in accordance with one possible configuration.

FIG. 5 is a cross-sectional side view of an example of a light guide assembly 500 that can be used in the luminaire 10. In this example, the Gaussian dots 26 are printed on the light exit surface 24a of the light guide 24 (e.g., the surface facing the street 14). In addition, LEDs 30 are provided around the perimeter of the light guide 24 on a LED strip 32, and a reflector sheet 28 is provided on the inner surface 24b of the light guide 24. Light rays 34 are emitted by the Gaussian dots 26 either towards the reflector sheet 28 and/or outside of the light guide 24.

In some aspects, the Gaussian dots 26 may redirect incident light in a diffusive/directional manner to achieve a desirable light distribution pattern. The Gaussian dots 26 may have diameters on the order of 1 mm. Additionally or alternatively, in some implementations, the Gaussian dots may be pitched at 1 mm or less. In such instances, the luminaire 10 may appear uniformly white to an observer due to the close proximity between the Gaussian dots 26.

In some implementations, the Gaussian dots 26 may be printed with ink using screen printing and/or any other suitable printing technique. Additionally or alternatively, the Gaussian dots 26 may be epoxy-based or silicone-based and contain diffusing particles, such as $SiO_2$, $TiO_2$, or high index micro-beads. In such instances, the Gaussian dots 26 may only slightly diffuse the light emitted by LEDs 30. For example, they may spread light in a pattern having a full-width half-maximum (HWHM) of about 12 degrees, centered on the direction of impinging light rays.

Figure 6:
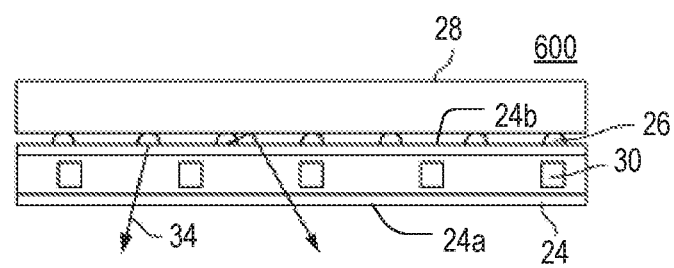
FIG. 6 is a cross-sectional side view of an example of a light guide assembly that can be used in the luminaire of FIG. 1, in accordance with another possible configuration.

FIG. 6 is a cross-sectional side view of an example of a light guide assembly 600 that can be used in the luminaire 10, according to aspects of the disclosure. As illustrated, in the light guide assembly 600, the Gaussian dots 26 are printed on the inner surface 24b of the light guide 24. Any light that is redirected upwards by the Gaussian dots 26 is reflected, by the reflector sheet 28, towards the light exit surface 24a of the light guide 24. In some implementations, the surface 24a may have a diffusive layer formed thereon to further tune the light distribution pattern of the luminaire 10. In some implementations, the diffusive layer may include a laminated sheet. Additionally or alternatively, in some implementations, the diffusive layer may be formed by machining or molding the light guide 24. Additionally or alternatively, in some implementations, other directional extraction elements may be included on the light guide 24. Such extraction elements may include optical elements that are formed on a laminated sheet or prisms that are molded directly onto the light guide 24.

Figure 7:
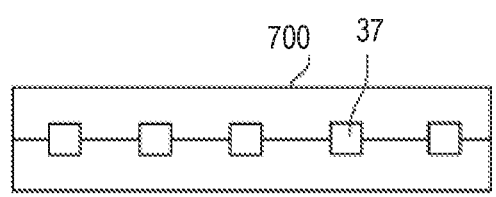
FIG. 7 is a diagram of an example of an LED strip, according to aspects of the disclosure.
Figure 8:
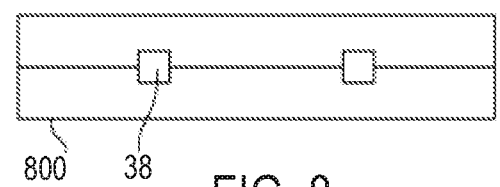
FIG. 8 is a diagram of an example of an LED strip, according to aspects of the disclosure.

FIG. 7 is a diagram of an example of an LED strip 700 that can be used in the luminaire 10, and FIG. 8 is a diagram of an example of LED strip 800 that can also be used in the luminaire 10. The LED strip 700 includes LEDs 37 that are arranged at a first pitch. The LED strip 800, on the other hand, includes LEDs 38 that are arranged at a second pitch that is greater than the first pitch. The luminaire 10 is thus not limited to using any specific type of LED or LED strip as its light source. The type of LEDs and/or LED strip can be selected on a case-by-case basis in accordance with design specifications and/or desired light distribution pattern.

Although the housing of the luminaire 10 is round, it may be configured to receive light guides of various shapes and/or different types of light sources (e.g., LED strips, individual LEDs, etc). For example, the housing of the luminaire 10 may be configured to receive light guides that are circular, rectangular, and/or light guides that have angled corners. More particularly, the luminaire 10 may be configured to receive any of the light guides discussed with respect to FIGS. 9-50 below. Providing the same (or similar housing) for different types of light guides may create a uniform aesthetic appearance, while reducing the overall cost of lighting systems in which the luminaire 10 is used.

Although in the present example the luminaire 10 has a round shape, alternative implementations are possible in which the housing of the luminaire 10 has a rectangular shape, and/or any other suitable shape. Furthermore, although in the present example the luminaire 10 is configured to provide a Type II light distribution, alternative implementations are possible in which the luminaire 10 is configured to have any desirable distribution, such as Type III or Type IV light distribution for example. The light distribution pattern of the luminaire 10 may be changed by swapping the light guide assembly that is disposed inside it. As discussed further below, this is possible because the light guide assembly may include all of the light extraction features that are needed for achieving a particular distribution pattern (e.g., a light guide assembly having a particular shape, Gaussian dots, prisms, LEDs that are oriented in particular direction, etc.).

In some aspects, the luminaire 10 may be part of a larger street lighting system. The street lighting system may include a plurality of luminaires which all have the same housing. In some aspects, the spacing between the luminaires may depend on the light distribution pattern of the luminaires. The greater the intensity of light that is emitted sideways, the greater the spacing. Moreover, in some instances, at least some of the luminaires, however, may have different light distribution patterns. For example, luminaires that are located at street corners may have a Type V distribution pattern, whereas luminaires that are located in the middle of street blocks may have a Type III distribution pattern. Further information about different light distribution patterns can be found in "Lighting for Exterior Environments," RP-33 published by the Illuminating Engineering Society of North America.

Figure 9:
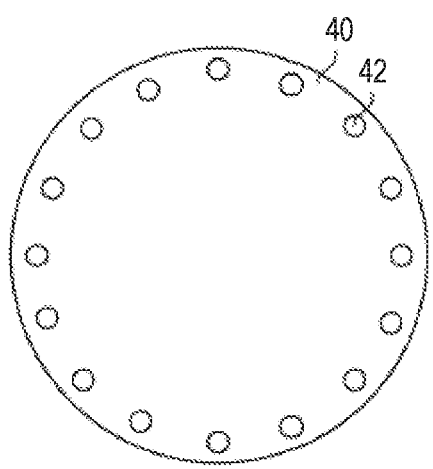
FIG. 9 is a diagram of an example of a light guide, according to aspects of the disclosure.
Figure 10:
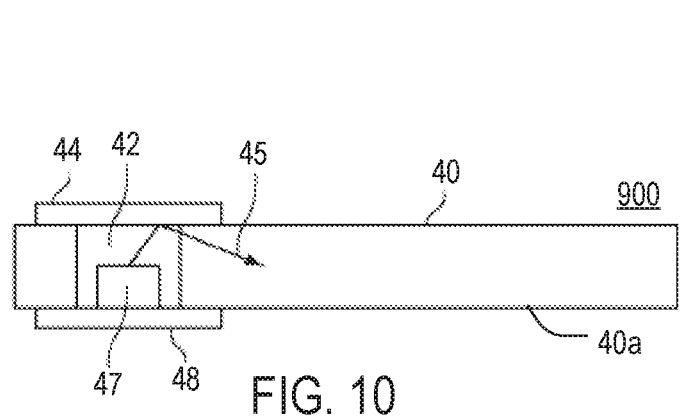
FIG. 10 is a cross-sectional side view of a portion of a light guide assembly that includes the light guide of FIG. 9, according to aspects of the disclosure.

FIG. 9 is a top-down view of an example of a light guide 40, and FIG. 10 is a cross-sectional side view of a portion of a light guide assembly 900 that includes the light guide 40, according to aspects of the disclosure. As illustrated, the light guide 40 may include recesses 42 formed around its perimeter. The recesses 42 may be through-holes or blind holes. Each of the recesses 42 may be arranged to receive a different LED 47 in an LED strip 48, as shown. A reflective ring 44 may be placed over the recesses 42. The ring 44 may be white, specular, diffusive specular, and/or any other suitable type of reflective ring. The reflective ring 44 may be operable to reflect light rays, such as the light ray 45, towards the light exit surface 40a of the light guide 40.

Figure 11:
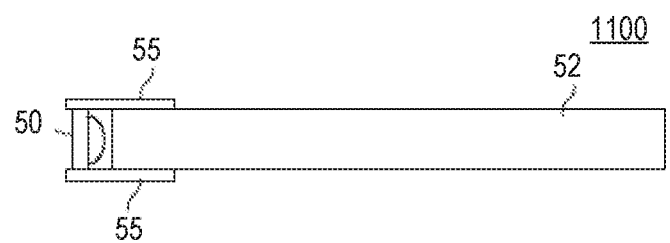
FIG. 11 is a cross-sectional side view of an example of a light guide assembly, according to aspects of the disclosure.
Figure 12:
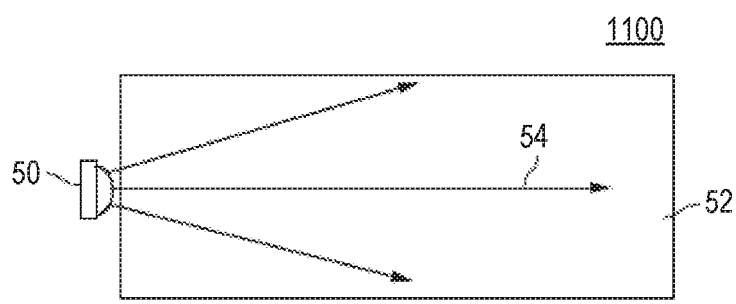
FIG. 12 is a cross-sectional top-down view of the light guide assembly of FIG. 11, according to aspects of the disclosure.

FIG. 11 is a cross-sectional side view of an example of a light guide assembly 1100 and FIG. 12 is a cross-sectional top-down view of the light guide assembly 1100, according to aspects of the disclosure. As illustrated, the light guide assembly 1100 may include one or more LEDs 50 that are coupled to an edge of a light guide 52. Reflectors 55 may be disposed above and/or below the LED 50, as shown. Coupling the LED 50 to the edge of the light guide 52 may result in a narrow beam of light being driven into the light guide 52, as indicated by the depiction of light rays 54.

Figure 13:
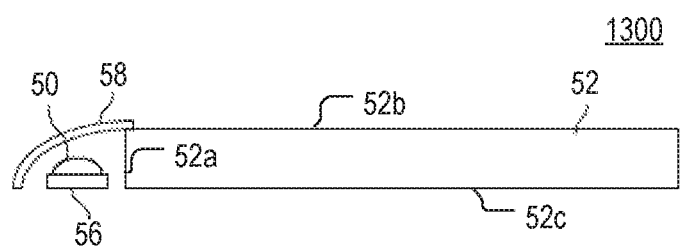
FIG. 13 is a cross-sectional side view of an example of a light guide assembly, according to aspects of the disclosure.

FIG. 13 is a cross-sectional side view of an example of a light guide assembly 1300, according to aspects of the disclosure. As illustrated, the light guide assembly 1300 may include an LED 50 coupled to an edge 52a of a light guide 52. The LED 50 may be arranged to face the plane of a surface 52b of the light guide 52 and a flexible circuit 56 that supports the LED 50 may be flush with a surface 52c of the light guide 52. A curved reflector 58 may be disposed above the LED 50, as shown. The reflector 58 may have a first end and a second end. The first end may sit in the same plane as the flexible circuit 56 and the second end may overlap with the surface 52b, as shown.

Figure 14:
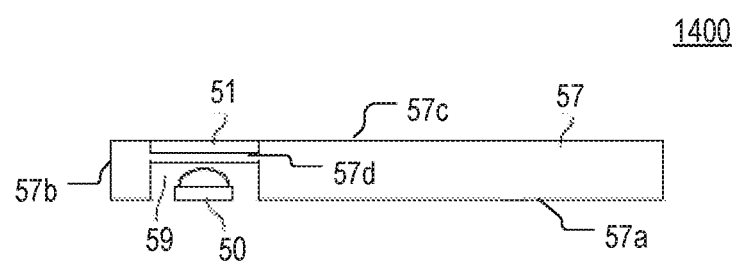
FIG. 14 is a cross-sectional side view of an example of a light guide assembly, according to aspects of the disclosure.
Figure 15:
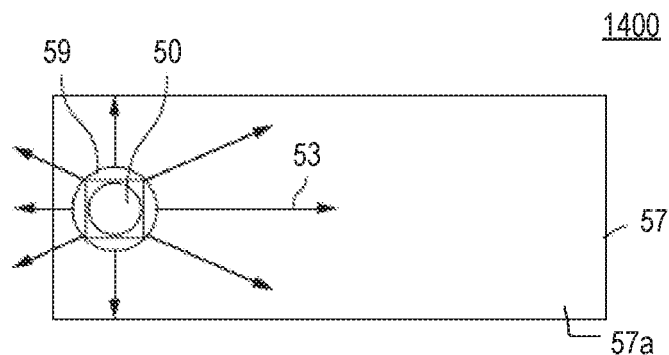
FIG. 15 is a cross-sectional top-down view of the light guide assembly of FIG. 14, according to aspects of the disclosure.

FIG. 14 is a cross-sectional side view of an example of a light guide assembly 1400 and FIG. 15 is a cross-sectional top-down view of the light guide assembly 1400, according to aspects of the disclosure. As illustrated, the light guide assembly 1400 may include a light guide 57 having a recess 59 formed in a surface 57a of the light guide. The recess 59 may be formed adjacently to an edge 57b of the light guide 57, as shown. In some implementations, the recess 59 may be a round hole that is sufficiently large to receive the LED 50 only. Additionally or alternatively, in some implementations, the recess 59 may be a slot extending along the edge 57b. In such instances, an entire LED strip including multiple LEDs may be disposed in the slot. Additionally or alternatively, in some implementations, the slot may extend substantially along the full length of the edge 57b (e.g., 900/% or more of the full length).

A reflector 51 may be disposed above the LED 50. In some implementations, the reflector 51 may be disposed in a recess formed in the top surface 57c of the light guide 57, such that the top surface 57c of the light guide 57 is flush with the top surface of the reflector 51. In some implementations, the recess in which the reflector 51 is placed may be formed substantially above the recess 59. Additionally or alternatively, in some implementations, the recess in which the reflector 51 is placed may be separated from the recess 59 by a portion 57d of the light guide 57.

In some aspects, because the LED 50 is placed in the light guide 57, with its base parallel to the main surfaces of the light guide, it may produce a 360° emission into the light guide 57, as illustrated by the depiction of light rays 53. This is in contrast to the LED 50 (of the light guide assembly 1100), which produced narrow emissions as a result of being oriented to face one or more of the edges of the light guide 52. In this regard, is should be again noted that edge injection of light (such as in the light guide assembly 1100) creates more directional light emission than embedded injection (such as in the light guide assembly 1400). Accordingly, by varying the number and positions of LEDs that are oriented towards the edges and the surfaces of a light guide, different asymmetric light distribution patterns can be achieved.

Figure 16:
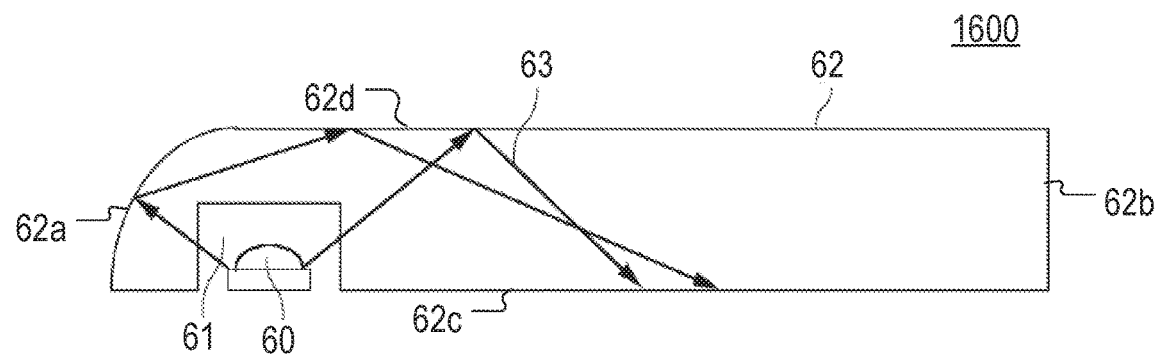
FIG. 16 is a cross-sectional side view of an example of a light guide assembly, according to aspects of the disclosure.
Figure 17:
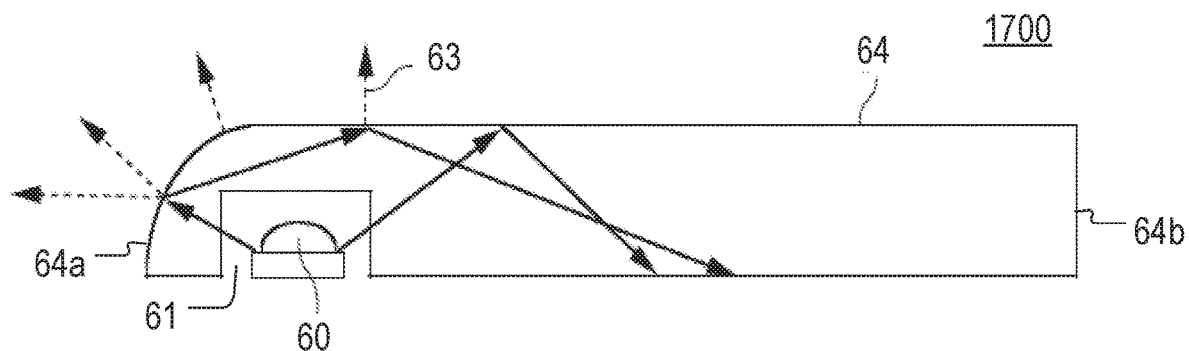
FIG. 17 is a cross-sectional side view of an example of a light guide assembly, according to aspects of the disclosure.

FIG. 16 is a cross-sectional side view of an example of a light guide assembly 1600, according to aspects of the disclosure. And FIG. 17 is a cross-sectional side view of an example of a light guide assembly 1700, according to aspects of the disclosure. The light guide assemblies 1600 and 1700 each include a light guide having a rounded edge. However, the light guide 62 of the assembly 1600 is formed of a material that has a different index of refraction than the material used to make the light guide 64 of the assembly 1700. As a result, the rounded edge 62a of the light guide 62 is able to reflect more light than the rounded edge 64a of the light guide 64.

More particularly, the assembly 1600 includes a light guide 62 having a rounded edge 62a and a straight edge 62b. A recess 61 is formed adjacently to the rounded edge 62a in the bottom surface 62c of the light guide 62. An LED 60 is disposed in the recess 61 and arranged to face the top surface 62d of the light guide 62. As noted above, the edge 62a of the light guide 62 is rounded to reflect light emitted from the LED 60 towards the surface 62d of the light guide 62. As illustrated, light rays 63, which are emitted by the LED 60, may be reflected from the edge 62a and returned to the light exit surface 62c, as shown. According to aspects of the disclosure, the radius of curvature of the edge 62a can be selected depending on the light distribution pattern that is desired of the light guide assembly 1600.

The recess 61 may include any suitable type of hole. For example, in some implementations, the recess 61 may be a round (or rectangular) hole that is sized to accept a single LED. Additionally or alternatively, in some implementations, the recess 61 may be a slot extending along the length of the edge 62a. In such instances, an entire LED strip including multiple LEDs may be disposed in the slot. Additionally or alternatively, in some implementations, the slot may extend substantially the full length of the edge 62a (e.g., along 90% or more of the full length). Additionally or alternatively, in some implementations, a reflective film may be disposed on the surface 62d to reflect the light rays 63 towards light exit surface 62c.

The light guide assembly 1700 includes a light guide 64 having a rounded edge 64a and a straight edge 64b. A recess 61 is formed adjacently to the rounded edge 64a and an LED 60 is disposed in it. As illustrated, the light guide 64 may be formed of a material having an index of refraction that permits light rays 63, which are emitted by the LED 60, to exit through the rounded edge 64a. Accordingly, the light guide assembly 1700 may be preferable over the light guide assembly 1600 in applications that require greater back emissions.

Figure 18:
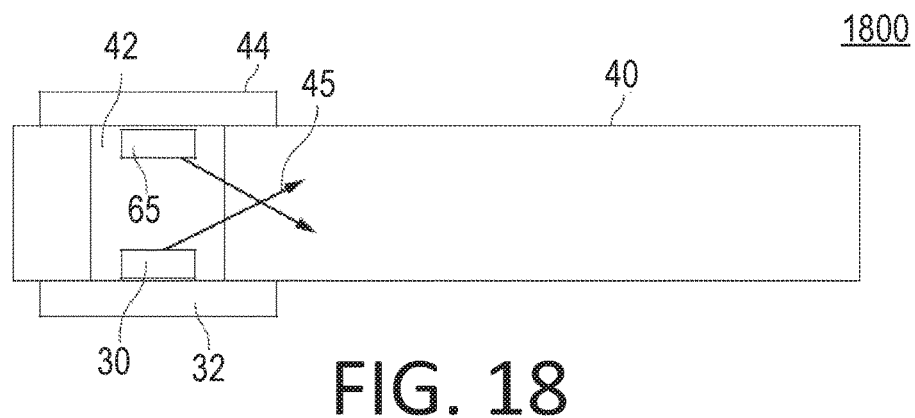
FIG. 18 is a cross-sectional side view of an example of a light guide assembly, according to aspects of the disclosure.

FIG. 18 is a cross-sectional side view of an example of a light guide assembly 1800, according to aspects of the disclosure. The light guide assembly 1800 is substantially similar to the light assembly 900, which is discussed with respect to FIGS. 9 and 10. However, in the light assembly of FIG. 18, an additional LED 65 is installed in the recess 42 to increase the assembly's light output or add a different color component to the light output. For example, the LED 65 may be a red LED that is arranged to supplement the (white light) LED 30 and make the light output by the light guide assembly warmer. In some implementations, the red LED may be controlled separately from the (white light) LED 30. In such instances, the color temperature of the light output of the assembly may be varied dynamically during its operation.

Figure 19A:
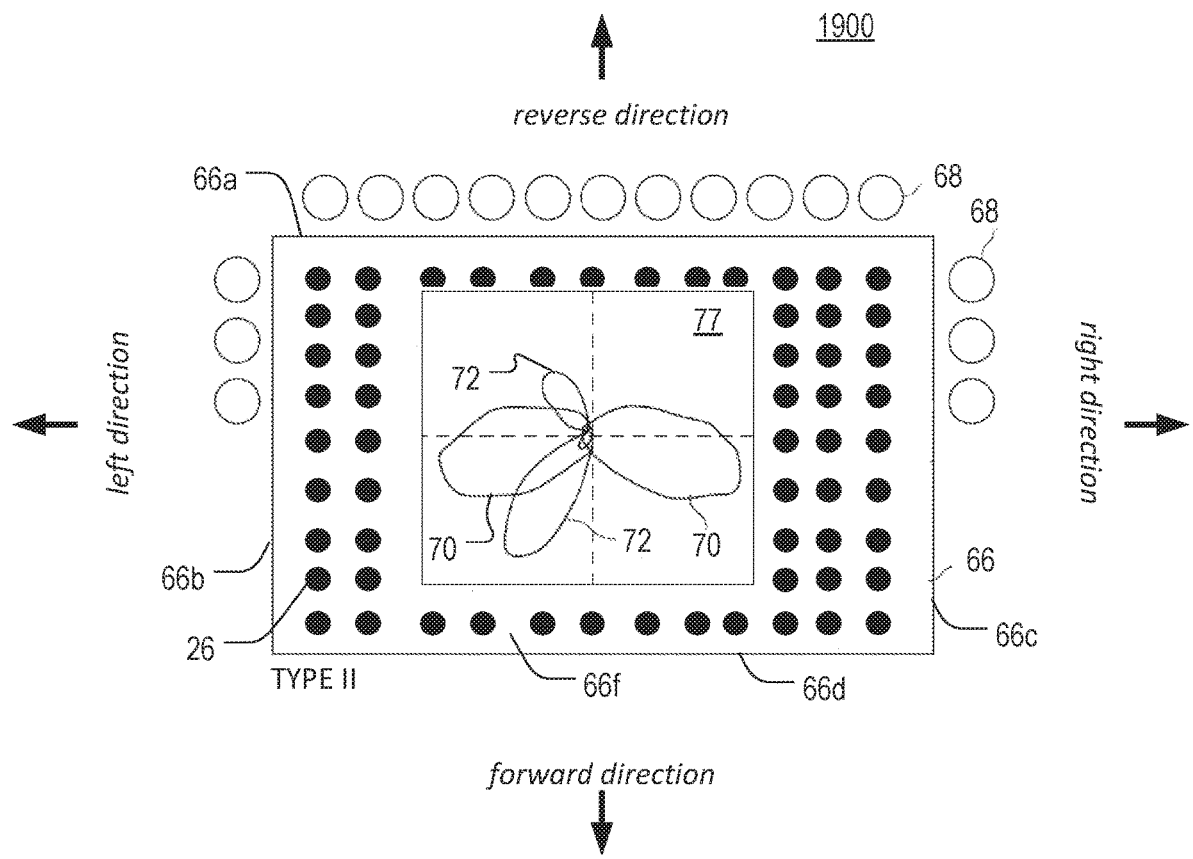
FIG. 19A is a top-down view of an example of a light guide assembly, according to aspects of the disclosure.
Figure 19B:
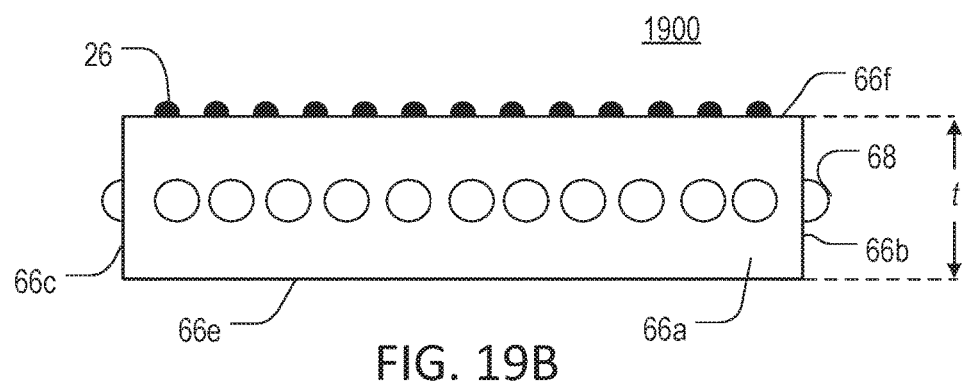
FIG. 19B is a side view of an example of the light guide assembly of FIG. 19A, according to aspects of the disclosure.

FIG. 19A is a top-down view of an example of a light guide assembly 1900 and FIG. 19B is a side view of the light guide assembly 1900, according to aspects of the disclosure. The assembly includes a light guide 66 and a plurality of LEDs 68 that are coupled to a rear portion of the light guide 66. In some aspects, the light guide assembly may be used in street lighting applications, as discussed with respect to FIG. 1.

In some implementations, the light guide 66 may have a thickness t that is equal to 5 mm and it may be formed of a transparent or translucent polymer, such as PMMA. Gaussian dots 26 may be printed on at least one of the surfaces 66e and 66f, as shown. The Gaussian dots 26 may be printed in a pattern to cause a direct view of the light guide to have a substantially uniform brightness. In some implementations, the pattern may be one in which the density of Gaussian dots increases with distance from the rear edge 66a in order to produce a substantially uniform brightness appearance when looking directly at the light guide exit surface. In such instances, the Gaussian dots 26 will have greater density near the front edge 66d than near the rear edge 66a.

Additionally or alternatively, in some implementations, the light guide 66 may be provided with other types directional light extraction features, such as prisms for example. Additionally or alternatively, in some implementations, the light guide 66 may be provided with non-directional light extraction features, such as random roughening. In some aspects, directional light extraction features may be preferable over non-directional light extraction features, as it may be more difficult to achieve non-uniform light distribution patterns with the latter.

In some implementations, the LEDs 68 may include white light LEDs using a GaN-based LED die emitting blue light combined with a YAG phosphor (emitting yellow light) to create white light. Additionally or alternatively, in some implementations, a red phosphor may be added to improve CRI. If the light guide is PMMA and the LED outer layer is silicone, such as YAG phosphor in a silicone binder, an air gap between the LED and light guide may be left for improved injection efficiency due to the various differences in the indices of refraction.

The plot 77 shows the light distribution pattern of the light guide assembly 1900. More particularly, the plot 77 includes graphs 70 and 72. Graph 70 shows the light distribution pattern produced by the light guide assembly 1900 in a horizontal plane that is aligned with the surfaces 66f and 66e of the light guide 66. Graph 72 shows the light distribution pattern produced by the light guide assembly 1900 in a vertical plane intersecting the assembly. The larger lobe of the graph 72 represents light emissions produced by the light guide assembly 1900 in the forward direction (e.g., front emissions). The smaller lobe of the graph 72 represents light emissions produced by the light guide assembly 1900 in the reverse direction (e.g., rear emissions).

Moreover, the light emissions of the light guide assembly 1900 in the left and/or right directions (e.g., side emissions) have a peak intensity that is at least twice the emissions produced in the forward direction. Furthermore, the peak intensity of the light emissions in the reverse direction is less than that of the light emissions in the forward direction. Stated succinctly, the light guide assembly 1900 is arranged to produce Type 11 light distribution pattern characterized by stronger front emissions, which makes it well-suited for street lighting applications.

According to aspects of the disclosure, the LEDs 68 along the rear edge 66a of the light guide 66 supply most of the light that is emitted in the forward direction. Furthermore, the LEDs 68 along the side edges 66b and 66c may contribute most of the light that is directed sideways and in the reverse direction. By adding more LEDs along the rear edge 66a or along the side edges 66b and 66c, the light distribution pattern of the assembly 1900 can be precisely tailored to a particular street width or pitch between street lights without changing the light guide 66 itself. In other words, only the arrangement of LEDs on a flexible circuit strip affixed around the rear portion of the light guide may need to be changed to adjust the light distribution pattern of the assembly 1900 to fit a particular application. Changing the arrangement of the LEDs may include changing the density of the LEDs per unit length of the strip, changing the pitch of the LEDs, changing the type of LEDs used in the strip, etc.

Figure 20A:
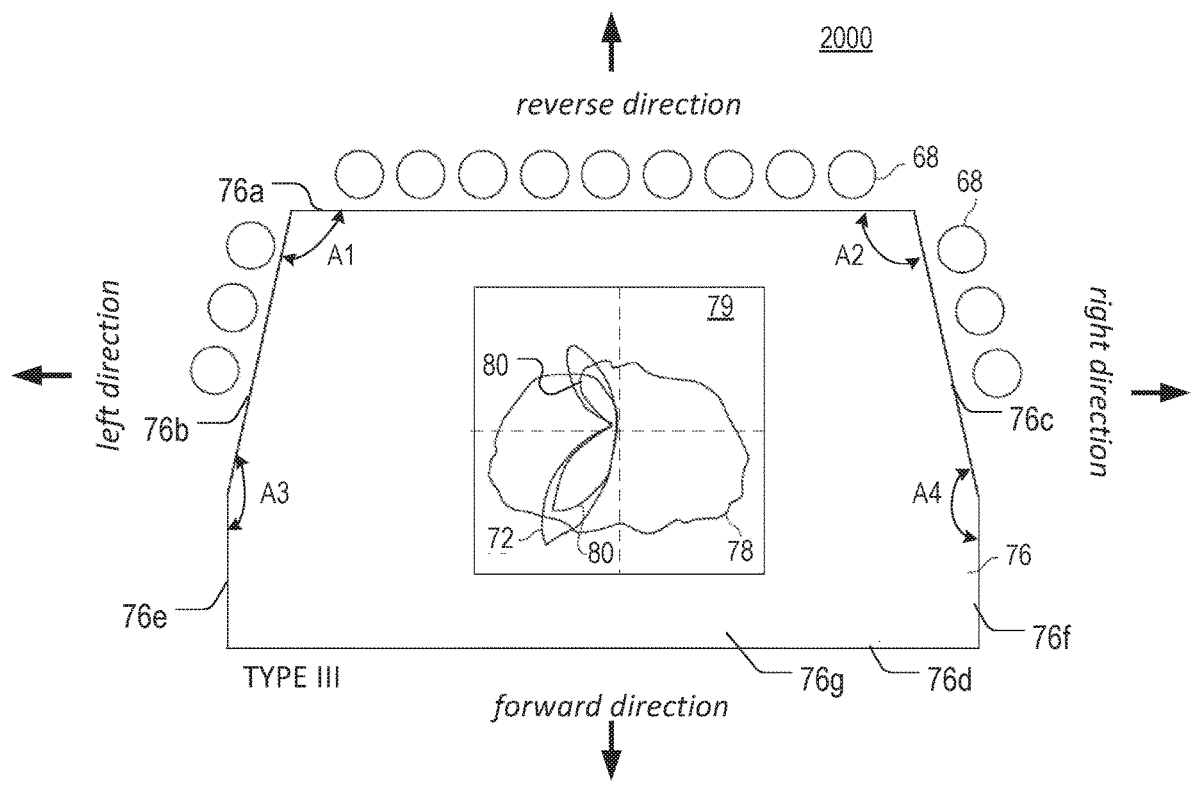
FIG. 20A is a top-down view of an example of a light guide, according to aspects of the disclosure.
Figure 20B:
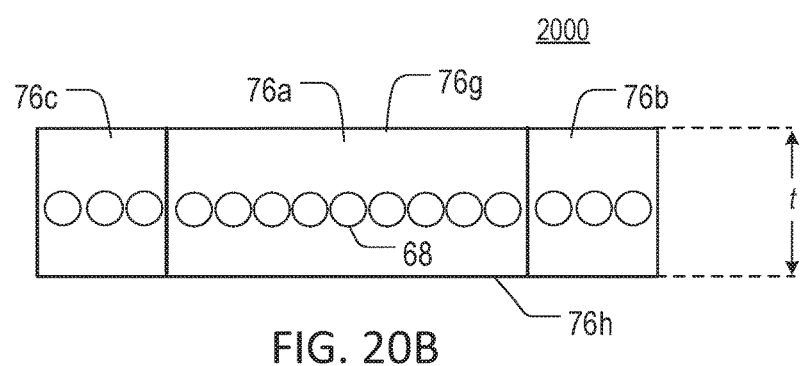
FIG. 20B is a side view of the light guide assembly of FIG. 20A, according to aspects of the disclosure.

FIG. 20A is top-down view of an example of a light guide assembly 2000, and FIG. 20B is a side view of the light guide assembly 2000, according to aspects of the disclosure. As illustrated, the light guide assembly 2000 may include a light guide 76 and a plurality of LEDs 68 coupled to a rear portion of the light guide 76. Although in the present example each of the LEDs 68 faces one of the edges of the rear portion of the light guide 76 (e.g., in the manner shown in FIG. 11), alternative implementations are possible in which one or more of the LEDs 68 are oriented are oriented upwards or downwards (e.g., in the manner shown in FIG. 13).

In some implementations, the light guide 66 may have a thickness t that is equal to 5 mm and it may be formed of a transparent or translucent polymer, such as PMMA. The rear portion of the light guide includes a rear edge 76a and side edges 76b and 76c. The angle A1 between the rear edge 76a and the side edge 76b may be 110 degrees. The angle A2 between the rear edge and the side edge 76c may also be 110 degrees. Although in the present example angles A1 and A2 are the same, alternative implementations are possible in which angles A1 and A2 are different.

The front portion of the light guide 76 includes a front edge 76d and side edges 76e and 76f. In some implementations, each of the side edges 76e and 76f may meet the front edge 76d at a right angle. Moreover, the angle A3 between the side edge 76b and the side edge 76e may equal 160 degrees. Similarly the angle A4 between the side edge 76c and the side edge 76f may equal 160 degrees. Although in the present example the angles A3 and A4 are the same, alternative implementations are possible in which the angles A3 and A4 are different. Although in the present example the front portion of the light guide assembly includes no LEDs whatsoever, alternative implementations are possible in which at least some of the LEDs 68 are disposed in the front portion of the light guide 76. Although not shown, the light guide 76 may include directional light extraction features on its surface(s) such as the printed Gaussian dots.

The plot 79 shows the light distribution pattern of the light guide assembly 2000. More particularly, the plot 79 includes graphs 72, 78, and 80. Graph 78 shows the light distribution pattern produced by the light guide assembly 2000 in a horizontal plane that is aligned with the surfaces 76g and 76h of the light guide 76. Graph 80 shows the light distribution pattern produced by the light guide assembly 2000 in a vertical plane intersecting the assembly 2000. Graph 72 shows the light distribution pattern produced by the light guide assembly 1900 in a vertical plane intersecting the assembly 1900. The larger lobe of the graph 80 represents light emissions produced by the light guide assembly 2000 in the forward direction (e.g., front emissions). The smaller lobe of the graph 80 represents light emissions produced by the light guide assembly in the reverse direction (e.g., rear emissions). As illustrated, the light guide assembly 2000 is arranged to produce a Type III light distribution pattern that includes a rear emission and front emission that is larger than the rear emission.

According to the present example, the light guide assembly 2000 emits less light than the light guide assembly 1900. This is so because the light guide assembly 2000 includes fewer LEDs than the light guide assembly 1900. However, light guide assembly 2000 outputs a greater proportion of its light output in the forward direction than the light guide assembly 1900. This is the result of the side edges 76b and 76c being positioned at obtuse angles relative to the rear edge 76a. Moreover, as illustrated by the graph 80, the peak intensity of the light emitted in the forward direction may be greater than the peak intensity of the light emitted in the reverse direction.

Figure 21A:
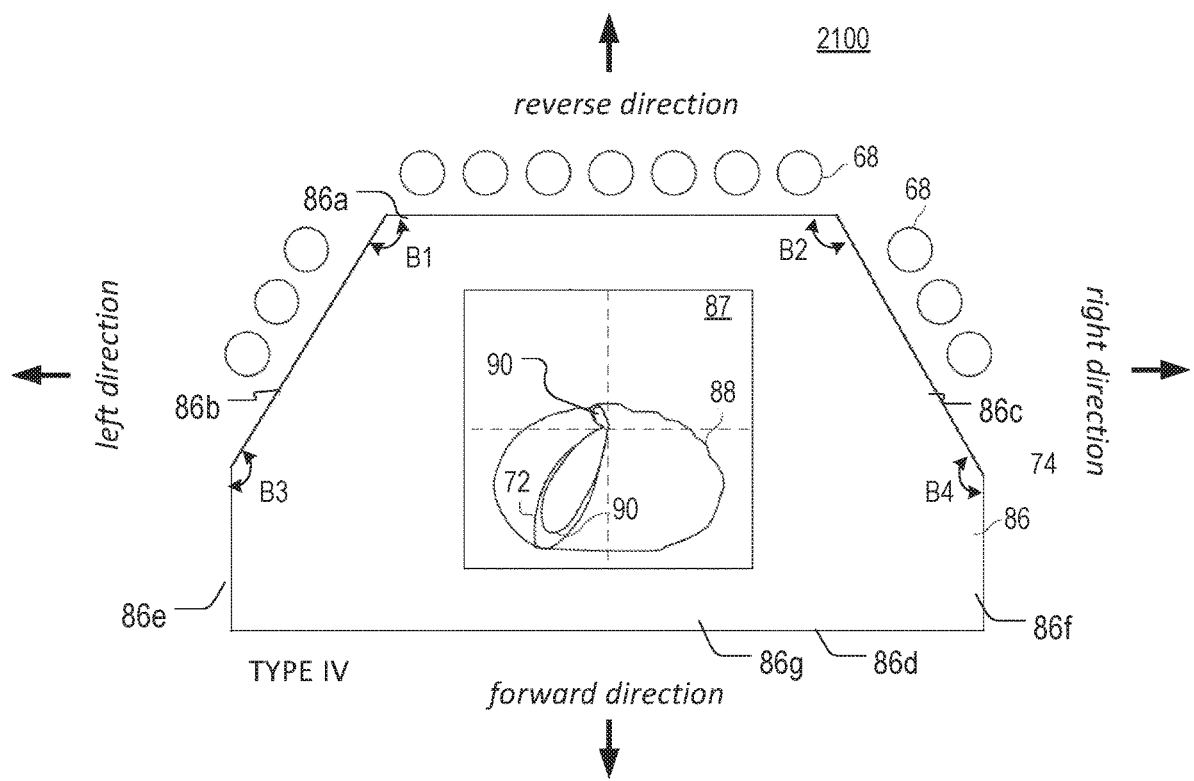
FIG. 21A is a top-down view of an example of a light guide assembly, according to aspects of the disclosure.
Figure 21B:
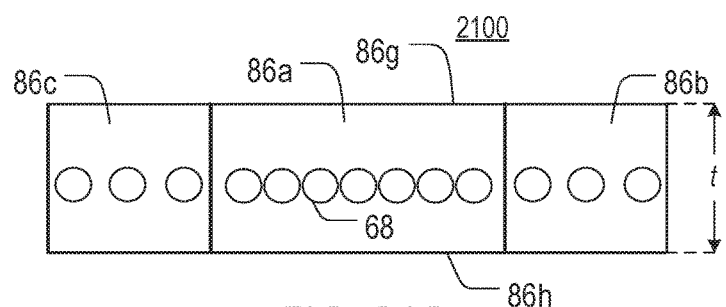
FIG. 21B is a side view of the light guide assembly of FIG. 21A, according to aspects of the disclosure.

FIG. 21A is a top-down view of an example of a light guide assembly 2100 and FIG. 21B is side view of the light guide assembly 2100, according to aspects of the disclosure. The light guide assembly 2100 differs from the light guide assembly 2000 in that its rear corners are more angled. As is further discussed below, increasing the angle between the side edges of the front portion of the light guide and the side edges of the rear portion (e.g., angle B3 and/or angle B4) may cause the light guide assembly 2100 to emit a greater proportion of its light output in the forward direction than the light guide assembly 2000.

In some aspects, varying the angle between the side edges of the front and rear protons of a light guide between 130 and 160 degree may be a practical way to control peak intensity of the front light emission of the light guide.

The light guide assembly 2100 includes a light guide 86 and a plurality of LEDs 68 coupled to a rear portion of the light guide 86. Although in the present example each of the LEDs 68 faces one of the edges of the rear portion of the light guide 86 (e.g., in the manner shown in FIG. 11), alternative implementations are possible in which one or more of the LEDs 68 are oriented are oriented upwards or downwards (e.g., in the manner shown in FIG. 13).

In some implementations, the light guide 86 may have a thickness t equal to 5 mm and it may be formed of a transparent or translucent polymer such as PMMA. The rear portion of the light guide includes a rear edge 86a and side edges 86b and 86c. Angle B1 between the rear edge 86a and the side edge 86b may equal 125 degrees. Angle B2 between the rear edge 86a and the side edge 86c may also equal 125 degrees. Although in the present example angles B1 and B2 are equal, alternative implementations are possible in which angles B1 and B2 are different.

The light guide assembly 2100 further includes a front portion. The front portion may include a front edge 86d and side edges 86e and 86f. In some implementations, the side edges 86e and 86f may meet the front edge 86d at a right angle. Moreover, the angle B3 between the side edge 86e and the side edge 86b may equal 145 degrees. The angle B4 between the edge 86f and the side edge 86c may also equal 145 degrees. Although in the present example angles B3 and B4 are equal, alternative implementations are possible in which angles B3 and B4 are different. Although in the present example no LEDs are situated in the front portion of the light guide 86, alternative implementations are possible in which one or more LEDs are coupled to at least one of the edges 86d, 86e, and 86f.

The plot 87 shows the light distribution pattern of the light guide assembly 2100. More particularly, the plot 87 includes graphs 88, 90 and 72. Graph 88 shows the light distribution pattern produced by the light guide assembly 2100 in a horizontal plane horizontal plane that is aligned with the surfaces 86g and 86h of the light guide 86. Graph 90 shows the light distribution pattern produced by the light guide assembly 2100 in a vertical plane intersecting the assembly 2100. Graph 72 shows the light distribution pattern produced by the light guide assembly 1900 in a vertical plane intersecting the assembly 1900. The larger lobe of the graph 90 represents light emissions produced by the light guide assembly 2100 in the forward direction (e.g., front emissions). The smaller lobe of the graph 90 represents light emissions produced by the light guide assembly in the reverse direction (e.g., rear emissions). As illustrated, the light guide assembly 2100 is arranged to produce a Type IV light distribution pattern including a rear emission and front emission that is larger than the rear emission.

The light distribution pattern of the light guide assembly 2100 is characterized by a wide emission in the forward direction (e.g., front emission) and a comparatively narrow emission in the reverse direction (e.g., rear emission). The emission of the forward direction is represented by the larger lobe of the graph 90 and the emission in the reverse direction is represented by the smaller lobe of the graph 90. As illustrated, the peak light intensity in the forward direction may be considerably higher than the peak light intensity in the reverse direction. In some aspects, because the front emission of the light guide assembly is relatively wide and uniform, the luminaire of FIG. 21 may be suitable for horticultural uses as an overhead grow-light. In such instances, the LEDs 68 may have color(s) that are optimal for growth.

In some aspects, the size of the angles B3 and B4 may influence the light distribution pattern of the light guide assembly 2100. As is illustrated by graph 90 and graph 80 (shown in FIG. 20), when the size of the angles B3 and B4 between the respective side edges of the front portion and the rear portion of the light guide assembly is decreased, more light is directed toward the front of the light guide 86 and ultimately emitted in the forward direction. Furthermore, in some implementations, the light distribution pattern of the light guide 86 may be tuned by including directional light extraction features on its surface(s), such as printed Gaussian dots. And still furthermore, the light distribution pattern of the light guide 86 may be tuned by carefully selecting the pitch and number of LEDs that are disposed in the light guide's 86 rear portion.

Figure 22A:
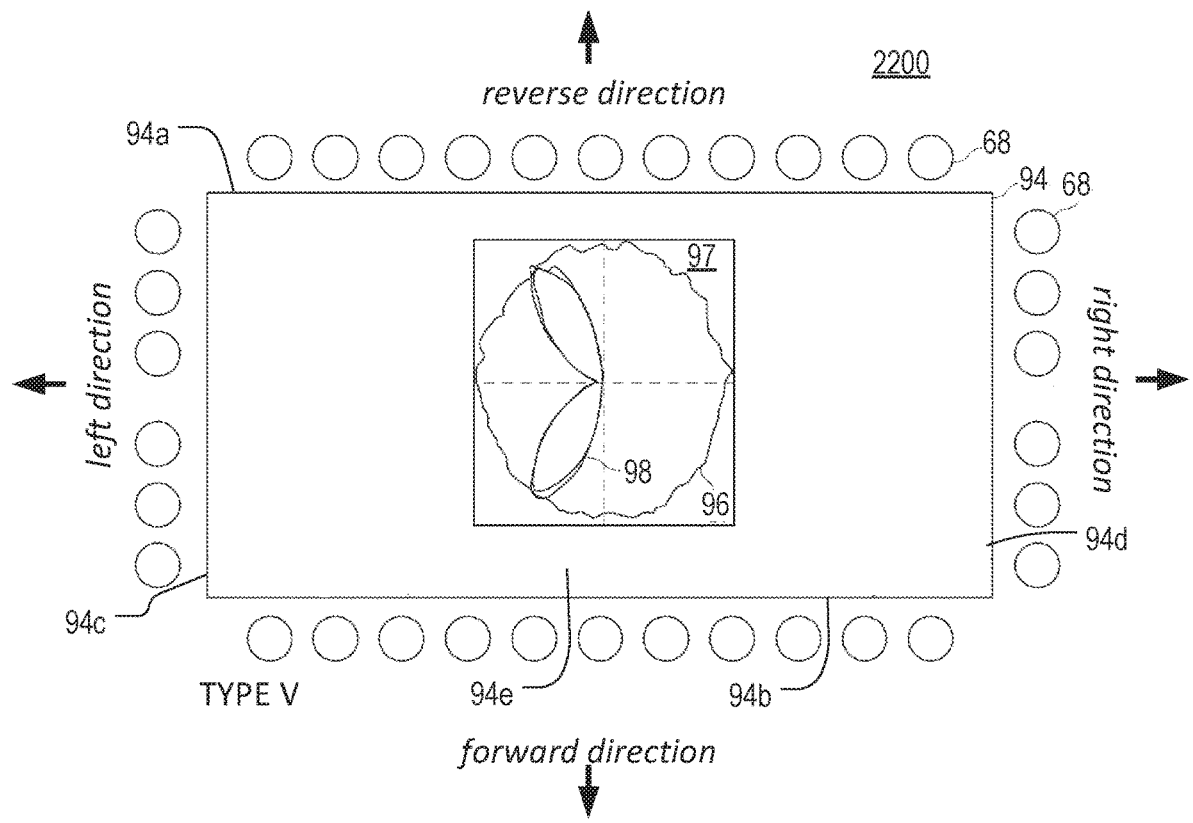
FIG. 22A is a top-down view of an example of a light guide assembly, according to aspects of the disclosure.
Figure 22B:
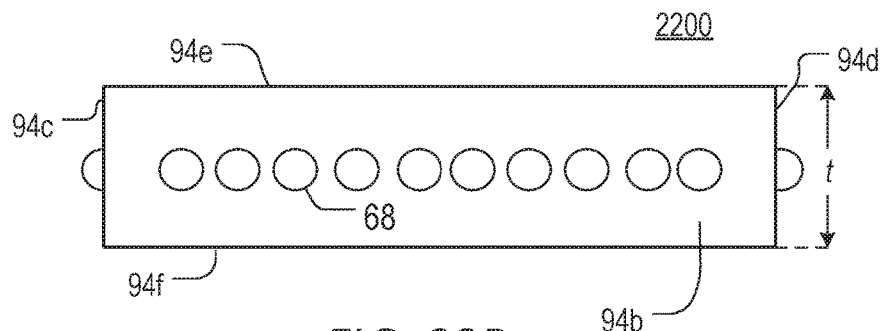
FIG. 22B is a side view of the light guide assembly of FIG. 22A, according to aspects of the disclosure.

FIG. 22A is a top-down view of an example of a light guide assembly 2200 and FIG. 22B is a side view of the light guide assembly 2200, according to aspects of the disclosure. The light guide assembly 2200 includes a light guide 94 coupled to a plurality of LEDs 68 that are evenly distributed on the edges 94a, 94b, 94c, and 94d of the light guide 94. Although in the present example each of the LEDs 68 faces one of the edges of the light guide 94 (e.g., in the manner shown in FIG. 11), alternative implementations are possible in which one or more of the LEDs 68 are oriented upwards or downwards (e.g., in the manner shown in FIG. 13).

In some implementations, the light guide 94 may have a thickness t equal to 5 mm and it may be formed of a transparent or translucent polymer, such as PMMA. The plot 97 shows the light distribution pattern of the light guide assembly 2200. More particularly, the plot 97 includes graphs 96 and 98. Graph 96 shows the light distribution pattern produced by the light guide assembly 2200 in a horizontal plane that is aligned with the surfaces 94e and 94f of the light guide 94. Graph 98 shows the light distribution pattern produced by the light guide assembly 2200 in a vertical plane intersecting the assembly 2200. As illustrated, the light guide assembly 2200 is arranged to produce a Type V light distribution pattern, which is characterized by a substantially uniform intensity in all directions.

According to aspects of the disclosure, any of the light guide assemblies may be disposed in the same luminaire housing to achieve consistent outward appearance when the light guide assemblies 1900-2200 are used in a larger illumination system (e.g., a street lighting system.) In a given illumination system, any of the guide light assemblies may be deployed at a location that is best suited for its respective light distribution pattern. For example, the light guide assembly 2100 may be deemed preferable for quiet residential neighborhoods (due to its reduced rear emissions), whereas the light guide assembly 1900 may be deemed preferable for commercial streets (due to its greater rear emissions).

FIGS. 23-26 illustrate top-down views of various light guide assemblies, according to aspects of the disclosure. The light guide assemblies include different shaped light guides 100-103, respectively, with LEDs located around the edges in different positions to achieve a desired light distribution pattern. The light guide assemblies shown in FIGS. 23-26 generally direct light away from the rear side R of their respective light guides. When the rear side of R of any of the light guides 100-103 is positioned against a wall, that light guide will emit light away from the wall in the forward direction. Stated succinctly, the light guide assemblies depicted in FIGS. 23-36 produce asymmetric light distribution patterns in which more light is emitted in the forward direction than in the rear direction. As noted above, the light guide assembly depicted in FIG. 24 may produce a Type IV light distribution which is suitable for street lighting applications.

According to aspects of the disclosure, a light guide assembly may be configured to have a specific light distribution pattern by strategically placing LEDs at specific locations on the light guide. As discussed above, when LEDs are placed on the edge of a light guide (e.g., in holes formed on the edge), the light guide may emit a comparatively narrow directional beam as a result. By contrast, when the LEDs are placed on a one of the surfaces of a light guide, the light guide may produce a wide (e.g., 3600) emission. Accordingly, by placing LEDs at different locations on the edges and/or surfaces of a light guide, different light distribution patterns can be achieved.

FIGS. 27-38 illustrate different examples of light guide assemblies in which LEDs are placed at different locations on the assemblies' respective light guides, according to aspects of the disclosure. Each of the light guide assemblies shown in FIGS. 27-32 includes one or more LEDs 68 that are either edge-coupled to the assembly's light guide (e.g., see FIGS. 27-30 and 32), cavity-coupled to the light guide (e.g., see FIG. 32), or coupled to one of the major surfaces of the light guide (e.g., see FIGS. 29 and 31). When an LED 68 is edge-coupled to a light guide, that LED 68 is affixed adjacently to an edge of the light guide, such that light emitted from the LED 68 enters the light guide through the light guide's edge, which in turn causes the light guide to produce a more directional light distribution pattern. Similarly, when an LED 68 is coupled to a major surface of the light guide, that LED is affixed adjacently to the major surface of the light guide, such that light emitted from the LED 68 enters the light guide through that surface, which in turn also causes the light guide to produce a more directional light distribution patterns.

In contrast, when an LED 68 is cavity-coupled to a light guide, that LED 68 is placed in a recess (or cavity) that is formed in the light guide. Light emitted from the LED 68 enters the light guide in all directions through the walls of the recess (or cavity), which causes the light guide to have a more widely-spread light distribution pattern. Notably, light that is injected into a light guide through a recess in the light guide may have a higher rate of propagation than light that is injected through the light guide's edges. Stated succinctly, the examples provided with respect to FIGS. 27-38 illustrate various combinations of positions of the LEDs 68 relative to a light guide which produce various desired light distribution pattern.

Figures 27, 28, 29, 30:
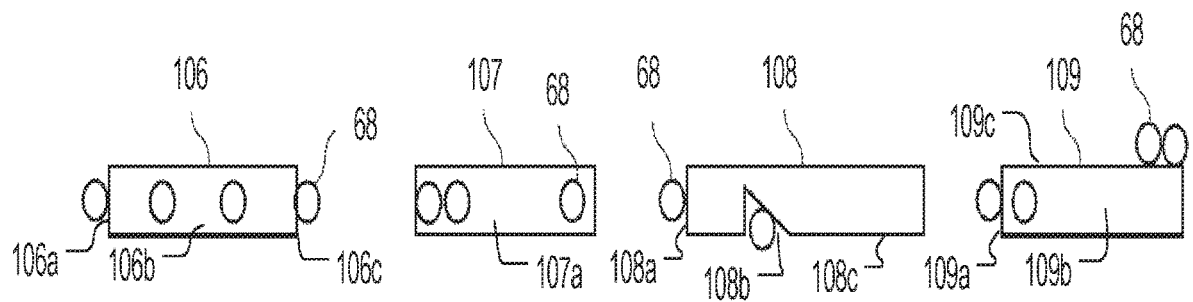
FIG. 27 is a side view of an example of a light guide assembly, according to aspects of the disclosure.
FIG. 28 is a side view of an example of a light guide assembly, according to aspects of the disclosure.
FIG. 29 is a side view of an example of a light guide assembly, according to aspects of the disclosure.
FIG. 30 is a side view of an example of a light guide assembly, according to aspects of the disclosure.

FIG. 27 is a side view of a light guide assembly including a light guide 106 and plurality of LEDs 68 that are distributed uniformly on the edges 106a, 106b, and 106c of the light guide 106.

FIG. 28 is a side view of a light guide assembly including a light guide 107 and a plurality of LEDs 68. In the example of FIG. 28, the LEDs 68 are arranged asymmetrically on the edge 107a of the light guide 107, such that more LEDs are disposed near one end of the edge 107a than the other.

FIG. 29 is a side view of a light guide assembly including a light guide 108 and a plurality of LEDs 68 arranged on the light guide. According to this example, at least one of the LEDs 68 may be located on the edge 108a of the light guide. Furthermore, one or more LEDs may be disposed in a recess 108b that is formed on the surface 108c of the light guide.

FIG. 30 is a side view of a light guide assembly including a light guide 109 and a plurality of LEDs 68. In the example of FIG. 30, one or more LEDs 68 may be disposed on the edges 109a and 109b of the light guide 109. In addition, one or more LEDs 68 may be disposed on the top surface 109c of the light guide 109. As illustrated, the LEDs 68 may be concentrated in one side of the top surface 109c. As discussed above, distributing LEDs in a non-uniform pattern on the edges and/or surfaces of the light guide 109 may cause the light assembly to have an asymmetric light distribution pattern.

Figures 31, 32:
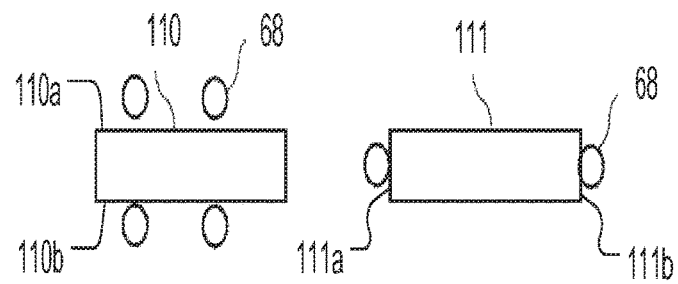
FIG. 31 is a side view of an example of a light guide assembly, according to aspects of the disclosure.
FIG. 32 is a side view of an example of a light guide assembly, according to aspects of the disclosure.

FIG. 31 is a side view of a light guide assembly including a light guide 110 and a plurality of LEDs 68. In the example of FIG. 31, one or more of the LEDs 68 may be arranged on the top surface 110a of the light guide 110. In addition, one or more of the LEDs 68 may be arranged on the bottom surface 110b of the light guide 110.

FIG. 32 is a side view of a light guide assembly including a light guide 111 and a plurality of LEDs 68. In the example of FIG. 32, the LEDs 68 are arranged on the edges 111a and 111b of the light guide 111.

Figure 33:
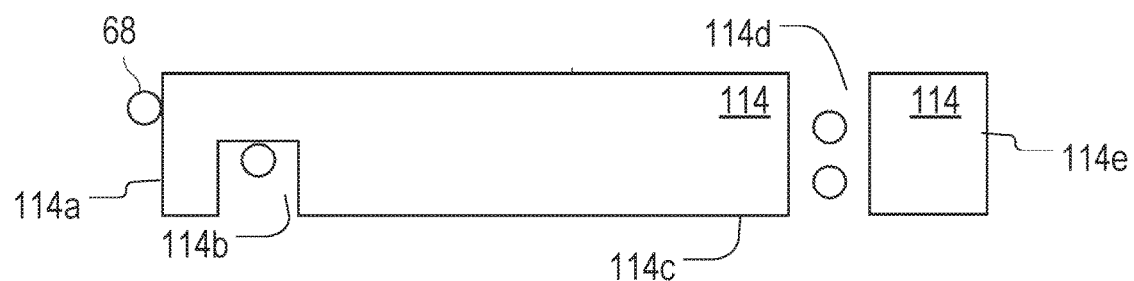
FIG. 33 is a cross-sectional side view of an example of a light guide assembly, according to aspects of the disclosure.

FIG. 33 is a cross-sectional side view of a light guide assembly including a light guide 114 and a plurality of LEDs 68. In the example of FIG. 33, at least one LED 68 may be disposed on the edge 114a of the light guide 114. Furthermore, at least one LED 68 may be disposed in a recess 114b formed in the bottom surface 114c of the light guide 114. Moreover, one or more LEDs may be disposed in a through hole 114d that is formed in the light guide 114. As illustrated, the recess 114b may be formed adjacently to the edge 114a of the light guide 114. The recess 114b may have any suitable shape. In some instances, the recess 114b may include a circular or rectangular hole that is sized to accept one or more LEDs 68. Additionally or alternatively, in some implementations, the recess 114b may be a slot extending along the edge 114a. Additionally or alternatively, in some implementations, the slot may extend substantially along the full length of the edge 114a (e.g., 90% or more of the full length). The through hole 114d may be formed adjacently to the edge 114e of the light guide 114. In some instances, the through hole 114d may include one of a circular or rectangular hole that is sized to accept one or more LEDs 68.

Figure 34:
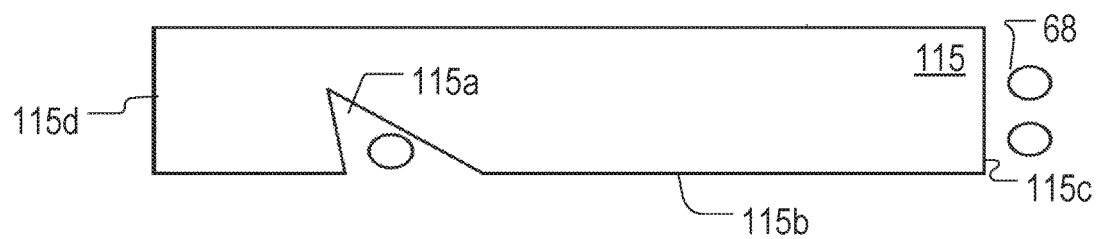
FIG. 34 is a cross-sectional side view of an example of a light guide assembly, according to aspects of the disclosure.

FIG. 34 is a cross-sectional side view of a light guide assembly including a light guide 115 and a plurality of LEDs 68. In the example of FIG. 34, at least one of the LEDs 68 may be disposed in a recess 115a formed in a surface 115b of the light guide 115. In addition, one or more of the LEDs may be disposed on the edge 115c of the light guide 115. As illustrated, the recess may have a triangular cross-section in order to direct light more efficiently in the direction of the edge 115d.

Figure 35:
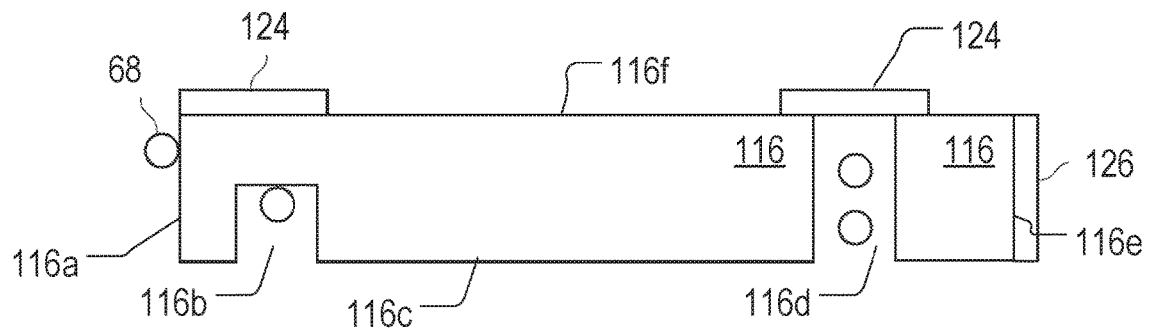
FIG. 35 is a cross-sectional side view of an example of a light guide assembly, according to aspects of the disclosure.

FIG. 35 is a cross-sectional side view of a light guide assembly including a light guide 116 and a plurality of LEDs 68. In the example of FIG. 35, at least one LED 68 may be disposed on the edge 116a of the light guide 116. In addition, one or more LEDs 68 may be disposed in a recess 116b that is formed in the surface 116c. Furthermore, one or more LEDs 68 may be disposed in a through hole 116d that is formed adjacently to the edge 16e of the light guide 116. According to aspects of the disclosure, a respective reflector 124 may be disposed above each of the recess 116b and the through hole 116d on the surface 116f of the light guide 116 to reflect light towards the light exit surface 116c. Moreover, a reflective film 126 may be disposed on the edge 116e of the light guide 116 to reflect light in the direction of the edge 116a.

Figure 36:
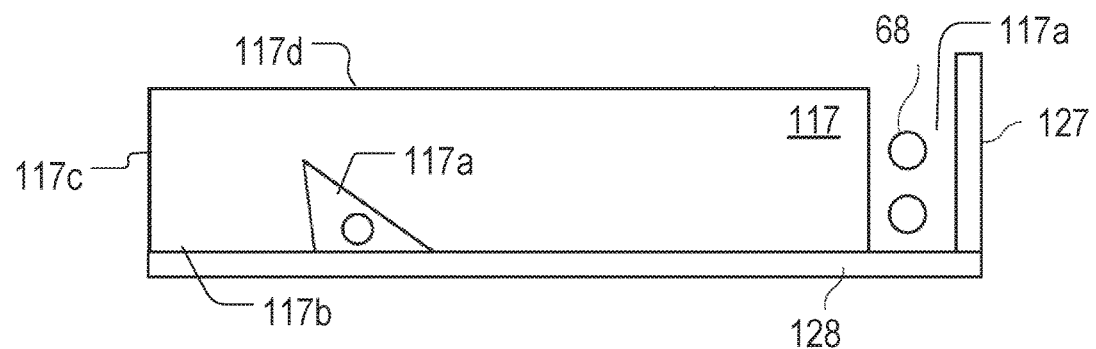
FIG. 36 is a cross-sectional side view of an example of a light guide assembly, according to aspects of the disclosure.

FIG. 36 is a cross-sectional side view of a light guide assembly including a light guide 117 and a plurality of LEDs 68. In the example of FIG. 36, at least one LED 68 may be disposed in a recess 117a that is formed on a surface 117b of the light guide 117. In addition, one or more LEDs 68 may be disposed between the edge 117c and a reflector 127, as shown. In addition, a reflector 128 may be disposed on the surface 117b to direct light towards the light exit surface 117d. As illustrated, the reflector 127 has a first end and a second end. The first end may be abutting the reflector 128 and the second end may protrude above surface 117d.

Figure 37:
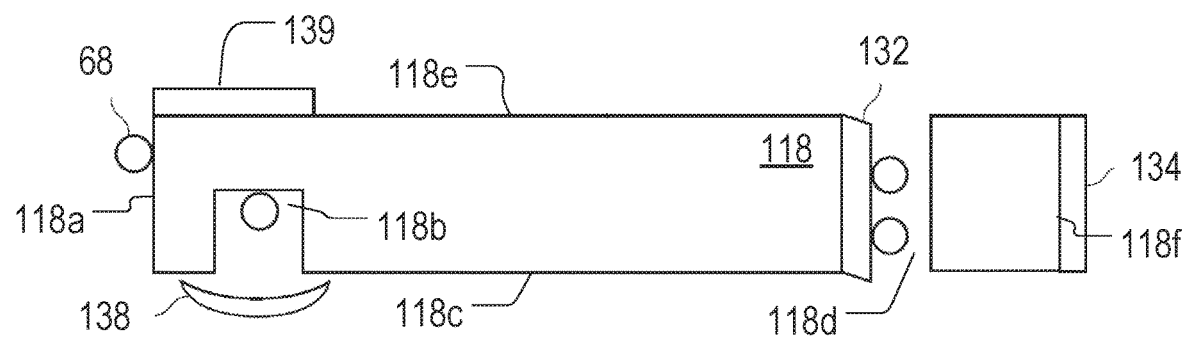
FIG. 37 is a cross-sectional side view of an example of a light guide assembly, according to aspects of the disclosure.

FIG. 37 is a cross-sectional side view of a light guide assembly including a light guide 118 and a plurality of LEDs 68. In the example of FIG. 37, one or more LEDs 68 may be placed on the edge 18a of the light guide 118. In addition, one or more LEDs 68 may be placed in a recess 118b that is formed in a surface 118c of the light guide 118 adjacently to the edge 118a. A lens 138 may be placed on the surface 118c, over the opening of the recess 118b and a reflector 139 may disposed on the surface 118e above the recess 118b, as shown.

Furthermore, one or more LEDs 68 may be disposed in a through hole 118d that is formed in the light guide 118 adjacently to the edge 118f. A partial reflector 132 may be coupled to one or more of the interior walls of the through hole 118d. The partial reflector 132 may reflect a portion of the light emitted by the LEDs in the through hole 118d towards the edge 118f of the light guide 118 while allowing the rest to travel towards the edge 118a. A diffusive reflector 134 may also be placed on the edge 116e, as shown, to reflect light towards the edge 118a.

Figure 38:
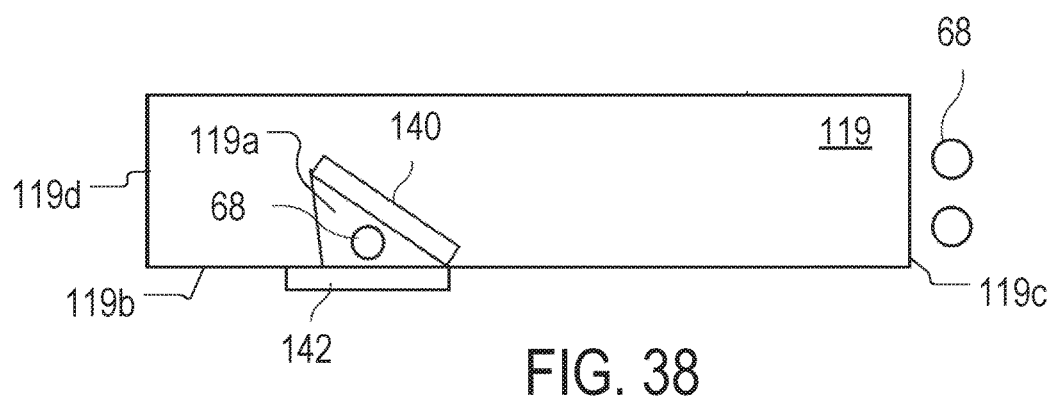
FIG. 38 is a cross-sectional side view of an example of a light guide assembly, according to aspects of the disclosure.

FIG. 38 is a cross-sectional side view of a light guide assembly including a light guide 119 and a plurality LED 68. In the example of FIG. 38, at least one LED 68 is disposed in a recess 119a that is formed in a surface 119b of the light guide 119. The recess 119a may have a triangular cross-section. A partial reflector 140 may be disposed on one or more of the slanted interior walls of the recess 119a to reflect light in the direction of the edge 119d, while a diffusive reflector 142 may be placed on the surface 119b to cover the opening of the recess 119a. The partial reflector 140 may reflect a portion of the light emitted by the LEDs while allowing the rest to travel across the reflector 140. Furthermore, one or more LEDs may be disposed on the edge 119c of the light guide 119, as shown.

In some implementations, LEDs emitting different colors may be combined in a light guide to achieve a desired color temperature. Additionally, the placement of the different color LEDs may be used to cause light having different color temperatures to be emitted in different directions from the light guide, such as a cooler white in the forward direction and a warmer white in the reverse direction. The various different color LEDs, such as white light LEDs and red LEDs, can be separately controlled to control the color temperature of the emissions from the light guide in different directions.

FIGS. 39-46 are cross-sectional side views of different examples of light guides, according to aspects of the disclosure. As illustrated, the present disclosure is not limited to any specific shape of light guide. More particularly, FIG. 49 depicts a light guide having a rectangular cross-section. FIG. 49 depicts a light guide having one sickle-shaped end that extends below the lower surface of the light guide. Notably, the example of FIG. 49 illustrates that any of the light guides discussed throughout the present disclosure can have a variable thickness.

FIG. 41 depicts an example of a light guide that includes a triangular recess formed in its lower surface. FIG. 42 depicts an example of a light guide having triangular protrusions that extend from its upper and lower surfaces. FIG. 43 depicts an example of a light guide having a recess formed in its bottom surface that has an oval cross-section. FIGS. 44 and 49 depict examples of light guides that have triangular cross-sections. And FIG. 46 depicts an example of a light guide having an arch-shaped cross-section.

FIGS. 47-50 are cross-sectional side views of different examples of light guides that are used in conjunction with different optical elements, such as reflectors or lenses. More particularly, FIG. 47 depicts an example of a light guide 170 having a partial reflector 176 disposed on its top surface. FIG. 48 depicts an example of a light guide 171 that is used in conjunction with a lens 178. FIG. 49 depicts an example of a light guide 172 that is used in conjunction with a lens array 180. And FIG. 50 depicts an example of a light guide 173 having one slanted edge. A reflector 182 may disposed on the slanted edge as shown. The light guide 173 may be used in conjunction with a lens 184. Notably, the light guides shown in FIGS. 40, 43, 44, 45, and 46 all have variable thickness. This permits light to be extracted from those light guides progressively very close to the horizontal direction. Although some of the concepts disclosed herein are presented in the context of street lighting, it will be understood that the light guides can be used in any suitable type of luminaire, including luminaires intended for indoor lighting, luminaires intended for horticultural lighting, luminaires intended for stage lighting, or luminaires intended for decorative lighting. Although in the present disclosure, different light guides are described as having a thickness of 5 mm, the present disclosure is not limited to any specific light guide dimensions. Any of the light guides discussed herein can have any suitable thickness (e.g., thickness under 1 cm, thickness under 2 cm, thickness under 5 cm, thickness under 10 cm, thickness under 20 cm, etc.) Although in the present disclosure, different light guides are described as being formed of a transparent or translucent polymer, such as PMMA, any suitable type of material can be used instead. Accordingly, the present disclosure is not limited to any specific material for making light guides. Furthermore, throughout the disclosure various examples are provided of light emissions being produced by respective light guides in the forward or reverse direction. As can be readily appreciated, these emissions need not be horizontal. For example, some or all of them might also be oriented downwards or upwards from the respective light guides.

FIGS. 1-50 are provided as an example only. At least some of the elements discussed with respect to these figures can be arranged in different order, combined, and/or altogether omitted. As used throughout the disclosure, the phrase "LED disposed on an edge of a light guide" shall be interpreted as referring to an arrangement in which an LED is affixed adjacently to the edge of the light guide, such that at least some of the light emitted from the LED enters the light guide through that edge. The LED may or may not come in direct contact with the edge. As can be readily appreciated, the LED may be affixed either proximately to or directly on the edge in any suitable manner and/or by using any suitable mechanical means, such as a mounting bracket, glue, etc. Furthermore, as used throughout the disclosure, the phrase "LED disposed on a surface of a light guide" shall be interpreted as referring to an arrangement in which an LED is affixed adjacently to the surface of the light guide, such that at least some of the light emitted from the LED enters the light guide through that surface. The LED may or may not come in direct contact with the surface. As can be readily appreciated, the LED may be affixed either proximately to or directly on the edge in any suitable manner and/or by using any suitable mechanical means, such as a mounting bracket, glue etc. It will be understood that the provision of the examples described herein, as well as clauses phrased as "such as," "e.g.", "including", "in some aspects," "in some implementations," and the like should not be interpreted as limiting the disclosed subject matter to the specific examples. As used throughout the disclosure, the term "adjacent" and its inflected forms may be interpreted as "lying near," "lying directly next to," and/or "lying some distance apart."

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is being claimed is:

1. An apparatus, comprising:
a light guide including a light exit surface and a reflection surface opposite the light exit surface;
a plurality of light emitting diodes (LEDs) positioned around a perimeter of the light guide and configured to direct light into the light guide; and
a plurality of dots positioned on the light guide and configured to extract light out of the light guide, the plurality of LEDs and the plurality of dots being positioned such that the extracted light is distributed asymmetrically around the perimeter of the light guide.

2. The apparatus of claim 1, wherein, for a first plane that is generally orthogonal to the light exit surface, the extracted light includes more light on a first side of the first plane than on a second side, opposite the first side, of the first plane.

3. The apparatus of claim 2, wherein the plurality of dots is distributed non-uniformly on the light guide.

4. The apparatus of claim 3, wherein the plurality of dots is distributed to have a higher density on the first side of the first plane than on the second side of the first plane.

5. The apparatus of claim 3, wherein the plurality of dots is distributed to have a density that varies with distance to a front edge of the light guide, the front edge being a portion of the perimeter of the light guide that is spaced farthest away from the first plane on the first side of the first plane.

6. The apparatus of claim 1, wherein the plurality of dots is positioned on the light exit surface of the light guide.

7. The apparatus of claim 1, wherein the plurality of dots is positioned on the reflection surface of the light guide.

8. The apparatus of claim 1, wherein the plurality of dots is printed on the light guide.

9. The apparatus of claim 1, wherein the plurality of dots is printed with ink on the light guide using screen printing.

10. The apparatus of claim 1, wherein the plurality of dots includes diffusing particles in a base material, the diffusing particles and the base material differing in refractive index.

11. The apparatus of claim 10, wherein the base material includes at least one of epoxy and silicone.

12. The apparatus of claim 10, wherein the diffusing particles include at least one of silicon dioxide and titanium dioxide.

13. The apparatus of claim 1, wherein the plurality of LEDs is distributed uniformly around the perimeter of the light guide.

14. The apparatus of claim 1, wherein the plurality of LEDs is distributed non-uniformly around the perimeter of the light guide.

15. A method, comprising:
producing light with a plurality of light emitting diodes (LEDs) positioned around a perimeter of a light guide, the light guide including a light exit surface and a reflection surface opposite the light exit surface;
directing the produced light into the light guide;
directing a first portion of the light, within the light guide, to strike the light exit surface;
directing a second portion of the light, within the light guide, to reflect off the reflection surface and strike the light exit surface; and
extracting, with a plurality of dots positioned on the light exit surface, at least some of the first portion of the light and at least some of the second portion of the light, the plurality of LEDs and the plurality of dots being positioned such that the extracted light is distributed asymmetrically around the perimeter of the light guide.

16. The method of claim 15, wherein for a first plane that is generally orthogonal to the light exit surface, the extracted light includes more light on a first side of the first plane than on a second side, opposite the first side, of the first plane.

17. The method of claim 16, wherein the plurality of dots is distributed non-uniformly on the light exit surface.

18. The method of claim 16, wherein the plurality of dots is distributed to have a higher density on the first side of the first plane than on the second side of the first plane.

19. The method of claim 16, wherein the plurality of dots is distributed to have a density that varies with distance to a front edge, the front edge being a portion of the perimeter of the light guide that is spaced farthest away from the first plane on the first side of the first plane.

20. An apparatus, comprising:
a light guide including a light exit surface and a reflection surface opposite the light exit surface;

a plurality of light emitting diodes (LEDs) positioned around a perimeter of the light guide and configured to direct light into the light guide; and a plurality of dots positioned on the light exit surface and configured to extract light out of the light guide, the plurality of LEDs and the plurality of dots being positioned such that for a first plane that is generally orthogonal to the light exit surface, the extracted light includes more light on a first side of the first plane than on a second side, opposite the first side, of the first plane.

* * * * *